US008644670B2

(12) United States Patent  (10) Patent No.: US 8,644,670 B2
Tanabe  (45) Date of Patent: Feb. 4, 2014

(54) APPARATUS AND METHOD FOR REPRODUCING CONTENTS

(75) Inventor: Hideki Tanabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1956 days.

(21) Appl. No.: 11/603,376

(22) Filed: Nov. 22, 2006

(65) Prior Publication Data

US 2007/0122121 A1    May 31, 2007

(30) Foreign Application Priority Data

Nov. 25, 2005    (JP) ................................ 2005-340280

(51) Int. Cl.
  *H04N 5/77*    (2006.01)
  *H04N 9/80*    (2006.01)

(52) U.S. Cl.
  USPC .......................................... 386/224; 386/248

(58) Field of Classification Search
  USPC ..................... 386/1, 45–46, 95–96, 125–126, 386/223–226, 248, 296, 297
  See application file for complete search history.

(56) References Cited

U.S. PATENT DOCUMENTS

| 2002/0174430 | A1* | 11/2002 | Ellis et al. | 725/46 |
| 2003/0108334 | A1* | 6/2003 | Nevenka et al. | 386/95 |
| 2003/0123853 | A1* | 7/2003 | Iwahara et al. | 386/69 |
| 2004/0258391 | A1* | 12/2004 | Saito et al. | 386/46 |
| 2005/0276571 | A1* | 12/2005 | Miyajima et al. | 386/46 |
| 2008/0068486 | A1* | 3/2008 | Kusaka | 348/333.02 |

FOREIGN PATENT DOCUMENTS

| JP | 2001-285760 | 10/2001 |
| JP | 2002-112201 | 4/2002 |
| JP | 2002-281447 | 9/2002 |
| JP | 2003-195845 | 7/2003 |
| JP | 2004-265477 | 9/2004 |
| JP | 2004-355681 | 12/2004 |
| JP | 2005-18912 | 1/2005 |
| JP | 2005-32297 | 2/2005 |
| JP | 2005-129093 | 5/2005 |
| JP | 2005-167880 | 6/2005 |

OTHER PUBLICATIONS

Japanese Office Action for Japanese Application No. 2005-340280, mailed on Oct. 28, 2008 (4 pages).
Patent Abstracts of Japan for Japanese Publication No. 2004-265477, Publication date Sep. 24, 2004 (1 page).

(Continued)

*Primary Examiner* — Thai Tran
*Assistant Examiner* — Nigar Chowdhury
(74) *Attorney, Agent, or Firm* — Osha Liang LLP

(57) ABSTRACT

A contents reproduction apparatus is provided that can resume reproduction according to the viewer. A CPU of a television executes the steps of: sending to a camera a command to pick up an image in response to input of an instruction to display a contents list; sending to an analysis unit a command to analyze image data of the person who inputs the instruction to display; specifying the person who inputs; sending data for displaying the list; detecting input of an instruction to select contents; calculating a backward amount in the case where the input instruction is an instruction to reproduce the same contents; and sending a command to reproduce the contents from a position preceding by the backward amount.

20 Claims, 22 Drawing Sheets

(56) References Cited

OTHER PUBLICATIONS

Hiroshi Shinjo et al., "Intelligent User Interface Based on Multimodal Dialog Control for Audio-Visual Systems", Hitachi Review vol. 87, No. 10 issue, pp. 47-50, Oct. 1, 2005—Hitach Hyoron-sha (5 pages).
Patent Abstracts of Japan for Japanese Publication No. 2001-285760, Publication date Oct. 12, 2001 (1 page).
Japanese Office Action for Japanese Application No. 2005-340280, mailed on Jun. 17, 2008 (6 pages).
Patent Abstracts of Japan for Japanese Publication No. 2005-129093, Publication date May 19, 2005 (1 page).
Patent Abstracts of Japan for Japanese Publication No. 2003-195845, Publication date Jul. 9, 2003 (1 page).
Patent Abstracts of Japan for Japanese Publication No. 2005-018912, Publication date Jan. 20, 2005 (1 page).
Patent Abstracts of Japan for Japanese Publication No. 2005-167880, Publication date Jun. 23, 2005 (1 page).
Patent Abstracts of Japan, Publication No. 2002-281447, Publication Date: Sep. 27, 2002, 1 page.
Patent Abstracts of Japan, Publication No. 2004-355681, Publication Date: Dec. 16, 2004, 1 page.
Patent Abstracts of Japan, Publication No. 2002-112201, Publication Date: Apr. 12, 2002, 1 page.
Patent Abstracts of Japan, Publication No. 2005-032297, Publication Date: Feb. 3, 2005, 1 page.

* cited by examiner

FIG.5

| VIEWER ID 510 | FACE IMAGE FILE 520 | AGE 530 | FIRST FEATURE AMOUNT (EYE TO EYE DISTANCE) 540 | SECOND FEATURE AMOUNT (EYE TO LIP DISTANCE) 550 | BACKWARD AMOUNT 560 |
|---|---|---|---|---|---|
| 01 (ME) | myself.jpg | 40 | 20mm | 50mm | 3 MIN. |
| 02 (FATHER) | father.jpg | 70 | 19mm | 48mm | 10 MIN. |
| 03 (MOTHER) | mother.jpg | 65 | 18mm | 47mm | 5 MIN. |
| 04 (DAUGHTER) | daughter.jpg | 10 | 17mm | 39mm | 2 MIN. |
| 05 (SON) | son.jpg | 5 | 16mm | 38mm | 1 MIN. |
| ... | ... | ... | ... | ... | ... |

262

APPARATUS AND METHOD FOR REPRODUCING CONTENTS

BACKGROUND OF THE INVENTION

1. Field of the Invention

The present invention relates to a technique of reproducing contents. In particular, the invention relates to an apparatus and a method with which reproduction of contents can be controlled according to a viewer.

2. Description of the Background Art

Regarding a HDD (Hard Disk Drive) recorder, DVD (Digital Versatile Disk) player and other digital data recording and reproducing apparatuses, so-called resuming reproduction capability is known. The resuming reproduction capability allows contents whose reproduction was stopped halfway to be reproduced again from the position where the reproduction was stopped.

In connection with such a capability, Japanese Patent Laying-Open No. 2002-281447 for example discloses an information reproduction apparatus with which a relation between information before reproduction and information after reproduction can easily be understood. Japanese Patent Laying-Open No. 2004-355681 discloses a reproduction apparatus with which the contents reproduced before the reproduction was stopped can be confirmed and the reproduction can then be started with the contents well understood. Japanese Patent Laying-Open No. 2002-112201 discloses an information reproduction apparatus that allows a plurality of users to use the reproduction resume capability. Japanese Patent Laying-Open No. 2005-032297 discloses a reproduction apparatus that can start, in the case where a plurality of users separately view one title, reproduction of the title from the position where each user stopped the reproduction.

With this resuming capability, reproduction of the same contents is resumed at the last position where the reproduction was stopped. Therefore, the viewer of the contents can view the subsequent part of the contents.

However, in the case where contents whose reproduction was stopped are reproduced again from the position where stopped, a problem occurs that the viewer, at the time immediately after the reproduction is started, cannot remember details of the contents. Further, in the case where a plurality of viewers watch the same contents, it does not necessarily occur that the same viewer gives an instruction to resume reproduction. Therefore, reproduction of contents cannot always be resumed appropriately for the viewer.

SUMMARY OF THE INVENTION

The present invention has been made with the purpose of solving the above-described problems. An object of the present invention is to provide an apparatus and a method with which reproduction of contents that was stopped halfway can be resumed according to a viewer.

Another object of the present invention is to provide an apparatus and a method with which reproduction of contents can be resumed according to details of the contents for which an instruction to reproduce is given.

In summary, with the purpose of achieving the above-described objects, according to an aspect of the present invention, an apparatus for reproducing contents includes: an image pickup unit picking up an image of a subject to output an image signal; a calculation unit performing a predetermined analysis process based on the image signal to calculate a feature amount of the subject; an identification information storage unit storing identification information of the subject and the feature amount associated with the identification information; a storage unit storing contents, a reproduction unit reproducing contents; an input unit accepting input of an instruction; a generation unit generating, based on input of a first instruction to reproduce contents, reproduction history information representing a history of reproduction of the contents; a history storage unit storing the reproduction history information; an image pickup control unit allowing, based on input of a second instruction to reproduce the contents, the image pickup unit to pick up an image of a subject who inputs the second instruction; a determination unit determining, based on input of the second instruction and the reproduction history information, a start position where reproduction of the contents is started according to the subject; and a reproduction control unit reproducing the contents from the start position.

According to another aspect of the present invention, an apparatus for reproducing contents includes: a contents memory storing contents; a memory driver reading data of contents stored in the contents memory; an input interface accepting input of an instruction; a camera picking up an image of a subject to output an image signal; a program memory storing a command sequence; and a processor, wherein said processor executes the set of instructions to: perform a predetermined analysis process based on the image signal to calculate a feature amount of the subject; store identification information of the subject and the feature amount associated with the identification information; generate, based on input of a first instruction to reproduce contents, reproduction history information representing a history of reproduction of the contents; store the reproduction history information; based on input of a second instruction to reproduce the contents, cause the camera to pick up an image of a subject who inputs the second instruction; based on input of the second instruction and the reproduction history information, determine a start position where reproduction of the contents is started according to the subject; and reproduce the contents from the start position.

According to still another aspect of the present invention, a method of reproducing contents by contents-storing apparatus based on a command sequence is provided. The apparatus includes a contents memory storing the contents, a memory driver reading data of contents stored in the contents memory, a user interface accepting input of an instruction, a camera picking up an image of a subject to output an image signal, a program memory storing a command sequence, and a processor executing the command sequence. The method includes the steps of: performing a predetermined analysis process based on the image signal to calculate a feature amount of the subject; storing identification information of the subject and the feature amount associated with the identification information; generating, based on input of a first instruction to reproduce contents, reproduction history information representing a history of reproduction of the contents; storing the reproduction history information; based on input of a second instruction to reproduce the contents, allowing the camera to pick up an image of a subject who inputs the second instruction; based on input of the second instruction and the reproduction history information, determining a start position where reproduction of the contents is started according to the subject; and reproducing the contents from the start position.

With the contents reproduction apparatus in accordance with the present invention, reproduction of contents whose reproduction was stopped halfway is started from a position determined depending on the viewer. Thus, the viewer can easily recall details of the contents and enjoy viewing the subsequent part of the contents.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 conceptually shows one form of data storage in a memory 262.

DESCRIPTION OF THE PREFERRED EMBODIMENTS

Figure 1:
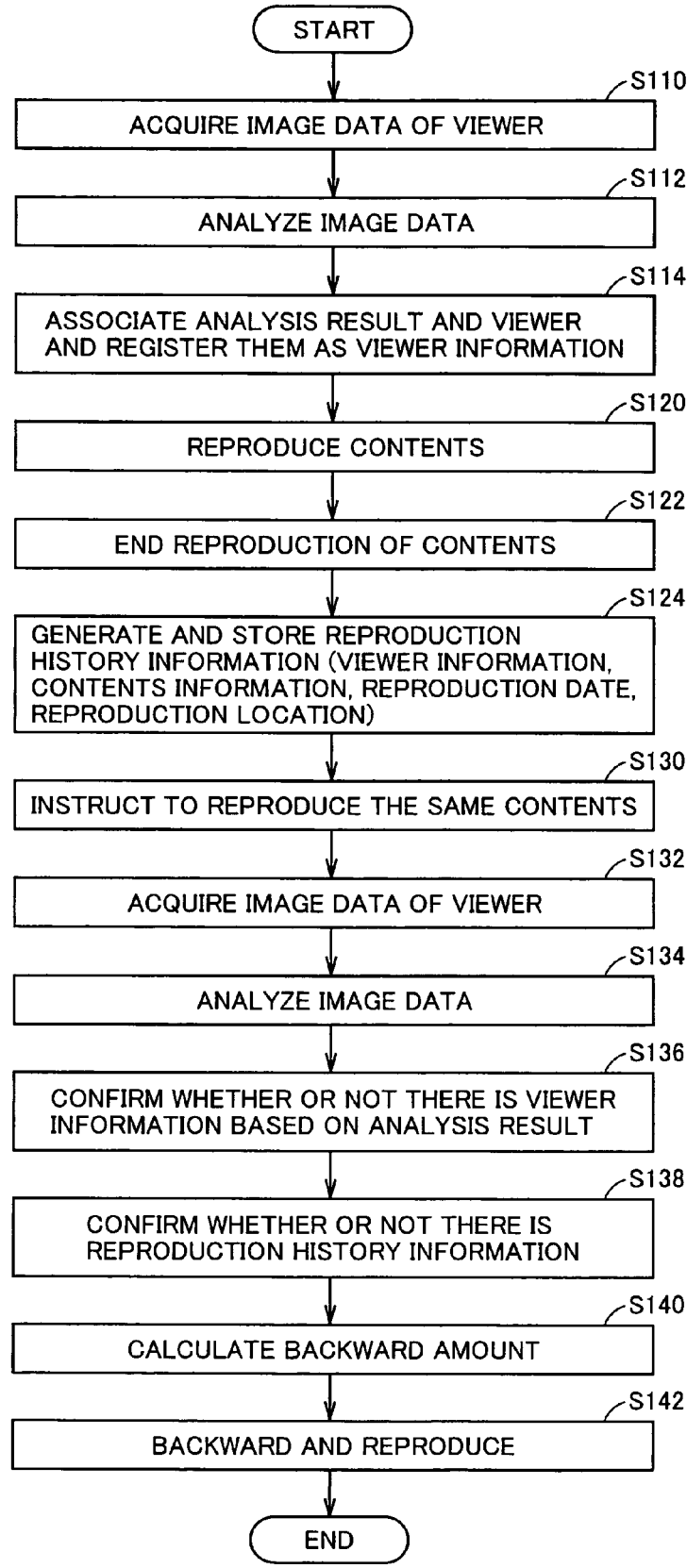
FIG. 1 is a flowchart generally showing an operation of a reproduction apparatus.

In the following, embodiments of the present invention are described. In the following description, like components are denoted by like reference characters. They are named identically and function identically. Therefore, a detailed description thereof is not repeated.

First Embodiment

Referring now to FIG. 1, a description is given of an operation of a contents reproduction apparatus according to a first embodiment of the present invention. The contents reproduction apparatus is implemented by an apparatus having the audio and video reproduction capability and the video display capability. For example, the contents reproduction apparatus is implemented by a television incorporating therein an HDD recorder, a VTR (Video Tape Recorder), a DVD player or any of other data recording and reproducing apparatuses. Alternatively, a video recording and reproducing apparatus and a display apparatus may be connected by a cable and, based on a control signal (remote control signal for example) for one of the video recording and reproducing apparatus and the display apparatus, the other apparatus may also operate in cooperation.

In step S110, the contents reproduction apparatus acquires image data of a viewer. In step S112, the contents reproduction apparatus analyzes the image data. In step S114, the contents reproduction apparatus registers viewer information associating the result of the analysis with the viewer. Thus, registration of the viewer who requests execution of the resuming capability is completed.

In step S120, the contents reproduction apparatus reproduces contents specified in response to a request from the viewer. In step S122, the contents reproduction apparatus ends the reproduction of the contents in response to input of an instruction to end reproduction. In step S124, the contents reproduction apparatus generates reproduction history information and stores it in an internal memory in response to the ending of the reproduction of the contents. Here, the reproduction history information includes, for example, viewer information, contents information, the date of reproduction, and the place of the reproduction. The contents information includes, for example, the title of the reproduced contents, reproduction mode and reproduction time. Thus, a record concerning the contents reproduced for the specific viewer is stored.

In step S130, the contents reproduction apparatus accepts input of an instruction to reproduce the same contents as the contents reproduced previously. In step S132, in response to input of the instruction, the contents reproduction apparatus acquires image data of a viewer who requests reproduction of the contents. The image data is acquired by means of a camera having a CCD (Charge Coupled Device) or any of other image pickup devices, included in the contents reproduction apparatus or connected to the contents reproduction apparatus for example. In step S134, the contents reproduction apparatus analyzes the acquired image data. In step S136, based on the result of the analysis, the contents reproduction apparatus confirms whether or not there is viewer information of the viewer who desires reproduction of the contents. The confirmation is made by reference to a memory storing viewer information for example. In step S138, the contents reproduction apparatus confirms whether or not there is reproduction history information concerning the viewer. Through the confirmation of such information, records of viewing in the past by the viewer who requests reproduction of the contents are retrieved and used later for calculating a backward amount. "Backward" herein used is described. If contents whose reproduction was stopped are to be reproduced again, "backward" refers to bringing the contents backward to any position that precedes the position where the reproduction was stopped. "Backward amount" refers to the amount by which the contents are brought backward in this way. The backward amount is represented for example by time or may be represented by any of other physical quantities. For example, the backward amount may be represented by a data amount from the beginning of the contents for example. Alternatively, the number of frames may be used.

In step S140, the contents reproduction apparatus calculates, based on the result as to the presence or absence of the reproduction history information, the backward amount for the reproduction start position of contents to be reproduced. In step S142, the contents reproduction apparatus reproduces the contents from the position preceding by the calculated backward amount.

Figure 2:
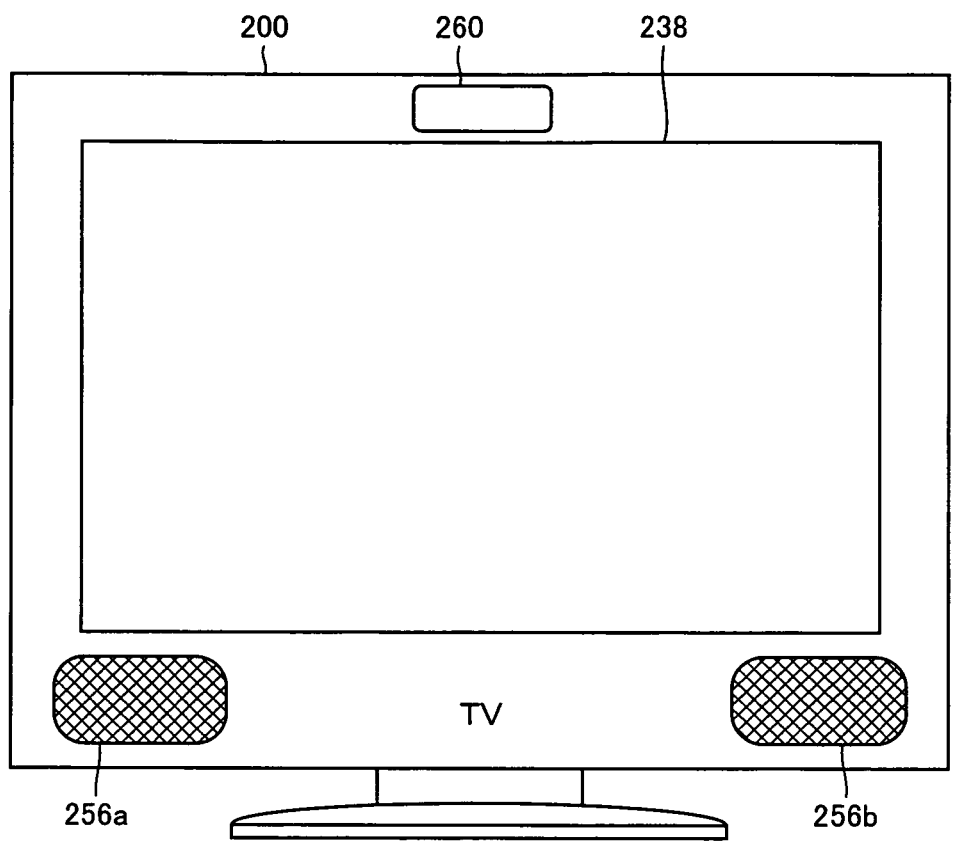
FIG. 2 is a front view of a television 200 that is one form of a contents reproduction apparatus according to a first embodiment of the present invention.

Referring to FIG. 2, a description is given of television 200 which is one form of the contents reproduction apparatus. FIG. 2 is a front view of television 200. Television 200 includes a display 238, a camera 260 and speakers 256a, 256b. Speakers 256a, 256b are speakers that can output stereo audio.

Figure 3:
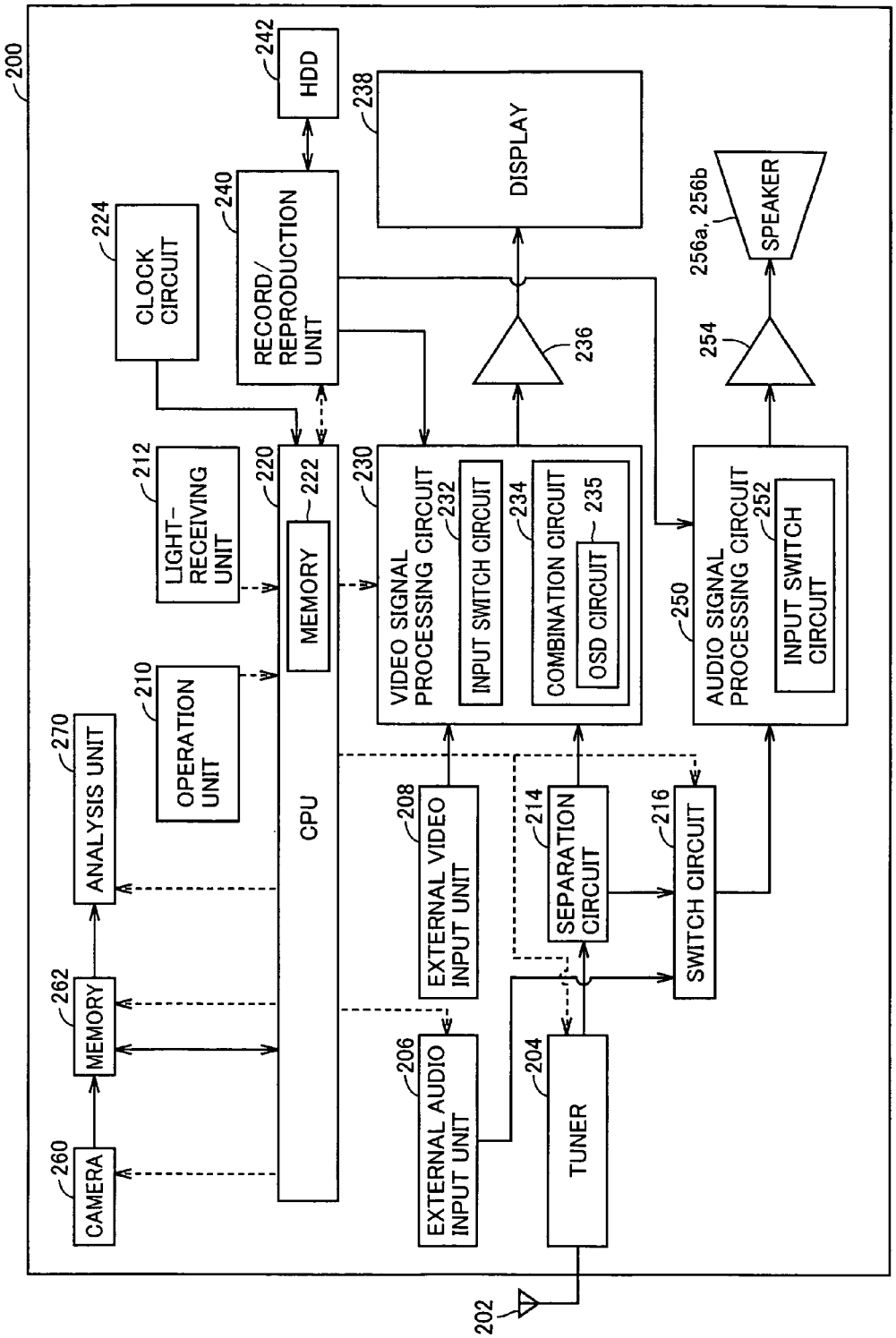
FIG. 3 is a block diagram showing a hardware configuration of television 200.

FIG. 3 is a block diagram showing a hardware configuration of television 200. Television 200 includes an antenna 202, a tuner 204, an external audio input unit 206, an external video input unit 208, an operation 210, a light-receiving unit 212, a separation circuit 214, a switch circuit 216, a CPU (Central Processing Unit) 220, a clock circuit 224, a video signal processing circuit 230, a record/reproduction unit 240, an HDD 242, an audio signal processing unit 250, an amplifier 254, a driver 236, a memory 262, and an analysis unit 270. CPU 220 includes a memory 222 temporarily storing data for operation.

Antenna 202 receives a broadcast signal. The broadcast signal may be an analog broadcast signal or a digital broadcast signal. The broadcast signal received by antenna 202 is sent to tuner 204. Tuner 204 selects, based on a control signal from CPU 220, a channel for which an instruction to tune to the channel is given. External audio input unit 206 accepts input of an audio signal from the outside of television 200. External video input unit 208 accepts input of a video signal from the outside of television 200. The audio signal accepted by external audio input unit 206 is sent to switch circuit 210.

The broadcast signal of the channel tuned by tuner 204 is sent to separation circuit 214. Separation circuit 214 separates the broadcast signal into an audio signal and a video signal. The audio signal generated by separation circuit 214 is input to switch circuit 216. The video signal generated by separation circuit 214 is input to video signal processing circuit 230. Video signal processing circuit 230 includes an input switch circuit 232 and a combination circuit 234. Combination circuit 234 includes an OSD (On Screen Display) circuit 235. Video signal processing circuit 230 selects, based on a control signal from CPU 220, a video signal that is from one of external video input unit 208 and separation circuit 214, and sends the selected signal to driver 236. Video signal processing circuit 230 further sends a video signal from record/reproduction unit 240 to driver 236. These video signals are switched for example by input switch circuit 232.

The combination circuit combines to output a plurality of signals that are input to video signal processing circuit 230. For example, OSD circuit 235 combines, with any video signal, such image data as the level of volume output from television 200 or the channel number and sends the signal as combined to driver 236.

Video signal processing circuit 250 performs signal processing as set in advance on an audio signal output from switch circuit 216 and an audio signal read from record/reproduction unit 240. Audio signal processing circuit 250 includes an input switch circuit 252 for selectively switching the input source of the audio signal. Input switch circuit 252 selectively sends out, based on a control signal from CPU 220, one of the audio signal output from switch circuit 216 and the audio signal output from record/reproduction unit 240. Amplifier 254 amplifies the audio signal output from audio signal processing circuit 250 to send the amplified signal to speakers 256a, 256b.

Figure 4:
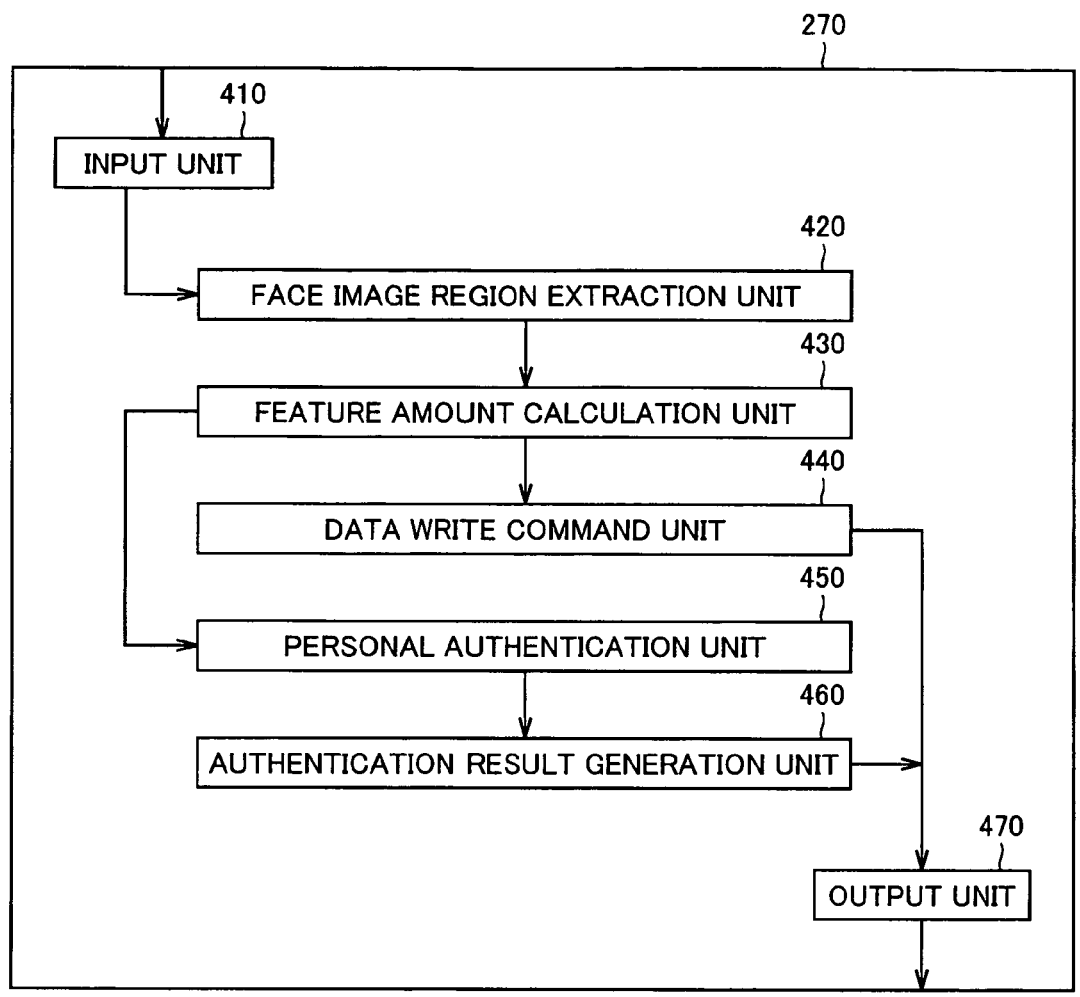
FIG. 4 is a block diagram showing a functional configuration implemented by an analysis unit 170.

Referring to FIG. 4, analysis unit 270 is described. FIG. 4 is a block diagram showing a functional configuration implemented by analysis unit 270. Analysis unit 270 includes an input unit 410, a face image region extraction unit 420, a feature amount calculation unit 430, a data write command unit 440, a personal authentication unit 450, an authentication result generation unit 460, and an output unit 470.

Input unit 410 accepts input of a command from CPU 220 via a signal line (not shown). Further, input unit 410 accepts input of data stored in memory 262. Face image region extraction unit 420 extracts, based on the image data that is read from memory 262, an image region corresponding to the face of a subject. This extraction process is described hereinlater. Feature amount calculation unit 430 calculates a feature amount of the image based on the image data of the face extracted by face image region extraction unit 420.

Here, "feature amount" refers to a value that is calculated from data for specifying an extracted region and that represents an attribute of the region. The feature amount includes, for example, the number of pixels constituting an image, the gray level of any image portion different in gray level from other portions and, in the case where there is a plurality of different-gray-level portions, the distance between any of these portions. If the number of pixels is used as the feature amount, data defining the size of each part of the face of the viewer is represented as the number of pixels. For example, the distance between eyes (distance between respective inner corners of right and left eyes), the distance between the eyes and the mouth (lip), and the length of an eyebrow for example are used as the feature amount.

Data write command unit 440 generates a command to store the feature amount calculated by feature amount calculation unit 430 in memory 262. The command is output via output unit 470. Personal authentication unit 450 authenticates the subject based on the feature amount calculated by feature amount calculation unit 430 and a feature amount of a viewer stored in advance in memory 262. The subject is authenticated for example by determining whether or not the calculated feature amount matches the feature amount stored in advance. Specifically, if a difference between the feature amounts is smaller than a predetermined range, it is determined that the subject with its image picked up is identical to the subject registered in advance. Otherwise, it is determined that the subject with its image picked-up is not registered in advance.

Authentication result generation unit 460 generates data representing the result of the authentication by personal authentication unit 450. The data is transmitted via output unit 470 to CPU 220.

Referring to FIG. 5, a data structure of television 200 is described. FIG. 5 conceptually shows a form of storage of data in memory 262. Memory 262 includes regions 510, 520, 530, 540, 550, 560 for storing data.

Information for identifying a viewer (viewer ID) is stored in region 510. Data of a face image acquired by picking up the image of the viewer is stored in region 520. Attribute information ("age" for example) of the viewer is stored in region 530. Feature amounts of the face of the viewer are stored in regions 540, 550 respectively. A backward amount that is input in advance for each viewer is stored in region 560. The data stored in regions 510 to 550 are associated with each other. Therefore, by designating the viewer ID stored in region 510, associated data, for example, the backward amount is specified. The place where data concerning the feature amount is stored is not limited to memory 262. For example, it may be stored in HDD 242. Alternatively, it may be stored in memory 222 in CPU 220.

Figure 6:
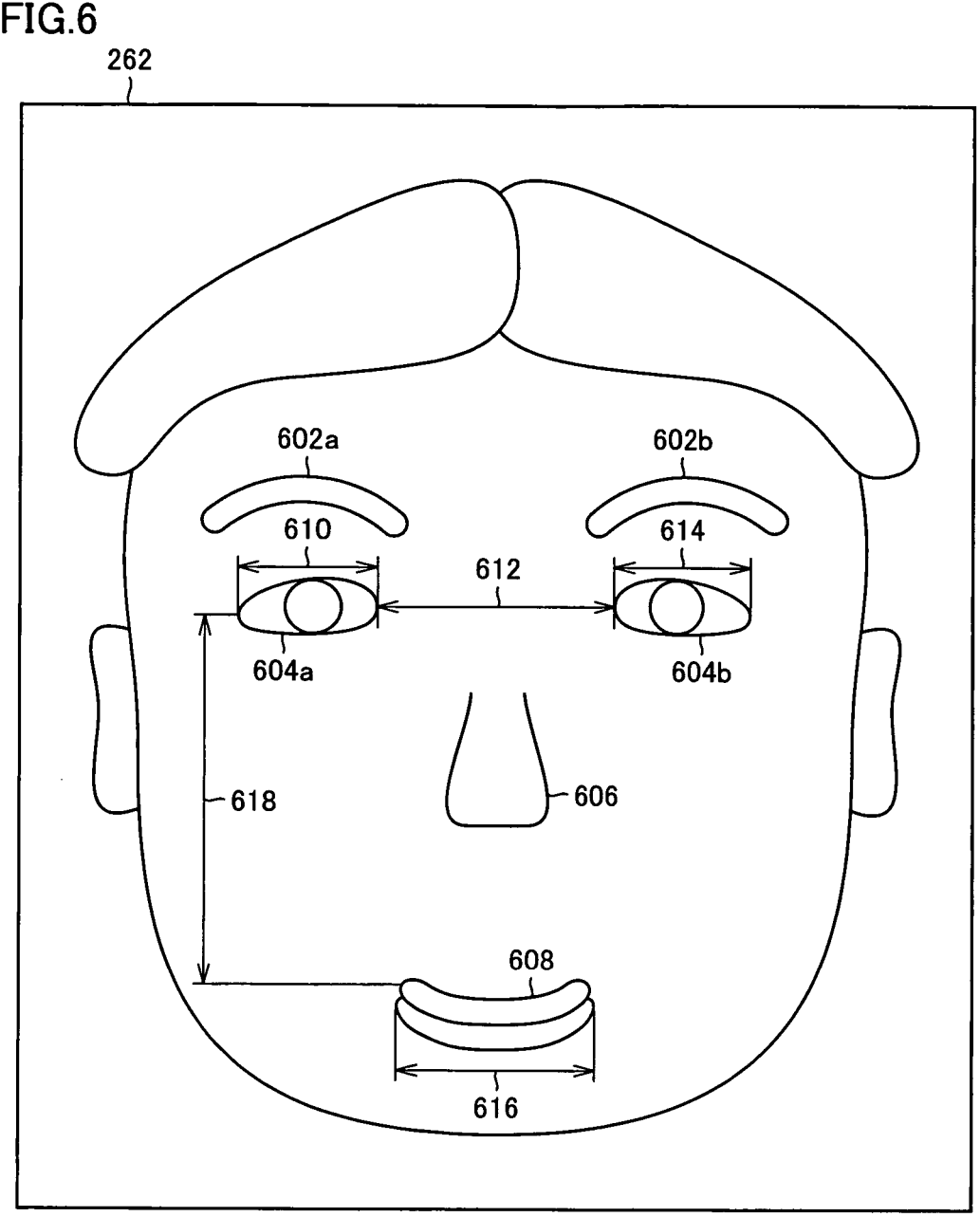
FIG. 6 conceptually shows a face image stored in memory 262.

Referring now to FIG. 6, a process of extracting face image data in the present embodiment is generally described. FIG. 6 conceptually shows a face image stored in memory 262.

When an image pickup process is performed normally with a subject positioned in front of display 238 of television 200, data generated by the image pickup process is stored in memory 262. The color of the subject's face includes the color of hair and the color of skin. For example, the color of the face includes a flesh-colored part and the other part. For example, hair, eyebrows and pupils are black, which is different from the flesh color. Then, for example, image data binarization processing or grayscale processing is performed on such a subject's image, so that an image having different shades of gray is generated.

More specifically, as shown in FIG. 6, eyebrows 602a, 602b, pupils 604a, 604b, nose 606, lips 608 each are extracted. When a region in memory 262 is specified beforehand, for example, the distance between eyes 612, eye lengths 610, 614, a mouth width 616, and the distance between the outer corner of the eye and the center of the lip 618 each are calculated as a relative distance. The distance is represented, for example, by the number of pixels. The value of distance 612 and the value of distance 618 are stored in the regions reserved in memory 262 as horizontal direction information and vertical direction information, respectively. Thus, the location of a subject with respect to the image generated by camera 260 can easily be specified.

It is noted that the process of extracting face image data and other processes for face recognition are easily understood by those skilled in the art. Therefore, a further detailed description thereof is not given here.

Figure 7:
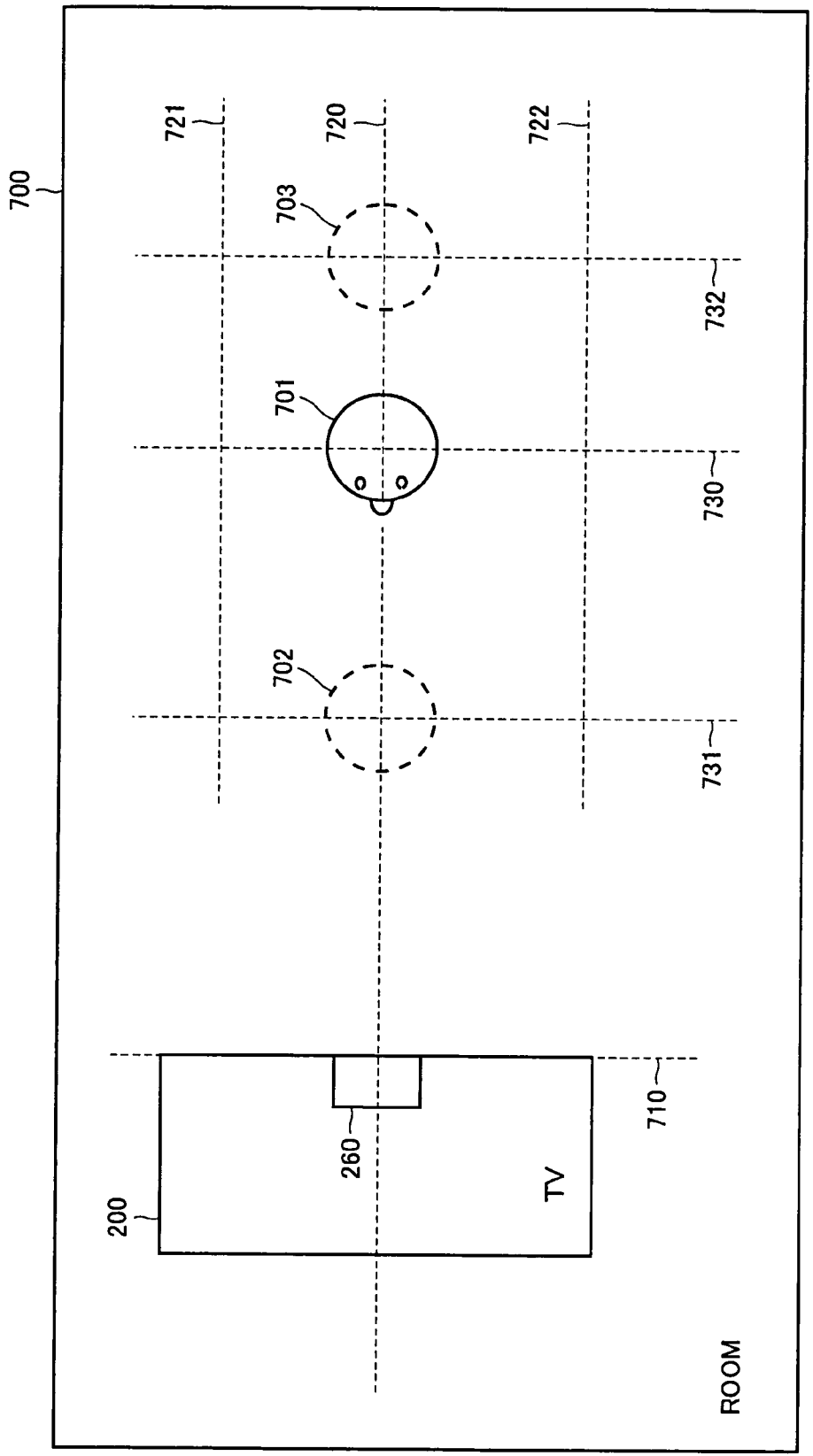
FIG. 7 shows, from above, a room where television 200 is installed.

Referring to FIG. 7, "standard position" in use of television 200 in the present embodiment is described. FIG. 7 shows, from above, a room where television 200 is installed. A viewer 701 is watching television 200 in a room 700. Viewer 701 is located at "standard position" with respect to television 200. Here, the standard position refers to a predetermined position with respect to camera 260 of television 200. This position is specified by the distance from television 200 and the distance from the axis passing through the center of television 200.

In the example shown in FIG. 7, the standard position is the intersection of a dotted line 720 with a dotted line 730. Dotted line 730 corresponds to a position away from a dotted line 710 corresponding to the base position of television 200 by a predetermined distance. Dotted line 720 corresponds to the central line of television 200, for example, such a line that passes through the center of camera 260 and orthogonally intersects display 330.

In this state, viewer 701 makes initial registration at television 200. More specifically, an image of viewer 701 is picked up by camera 260, and analysis unit 270 then recognizes the face image of viewer 701 and calculates the feature amount. As a result, when viewer 701 is recognized correctly, the feature amount is registered at television 200. The image of viewer 701 is picked up by camera 260 every time viewer 701 watches television 200. Thus, a newly calculated feature amount can be compared with the already stored feature amount.

Viewer 701 may watch television 200 at a position closer to television 200 than the standard position. For example, viewer 701 may watch television 200 at a position 702 on a dotted line 731. On the contrary, viewer 701 may watch television 200 at a position 703 corresponding to a dotted line 732 away from television 200. In such a case, the distance between viewer 701 and camera 260 is reduced or increased. In the present embodiment, the ratio between the feature amounts is used to recognize a viewer. For example, the ratio between the distance between the viewer's eyes and the distance between the eye and the lip are used for recognition. In this case, the same viewer would have the ratio having the same value even if the distance from camera 260 varies. Therefore, viewer 701 is not recognized as a different viewer erroneously. Thus, the subsequent operation of television 200 is also realized under control according to viewer 701.

Furthermore, a viewer may watch television 200 at a position shifted from the central axis 720 with respect to television 200. For example, a plurality of viewers watch video on television 200. Specifically, other viewers may watch television 200 at positions on dotted lines 721, 722. Also in this case, the value of the ratio between the feature amounts is not largely shifted from the value of the ratio between the feature amounts that is registered beforehand, so that the same viewer can be correctly authenticated by setting the shift amount as an error in advance.

It is noted that the position different from the standard position is not limited to those shown in FIG. 7. The position at which video on television 200 can be watched in room 700 may be different from the standard position.

Figure 8:
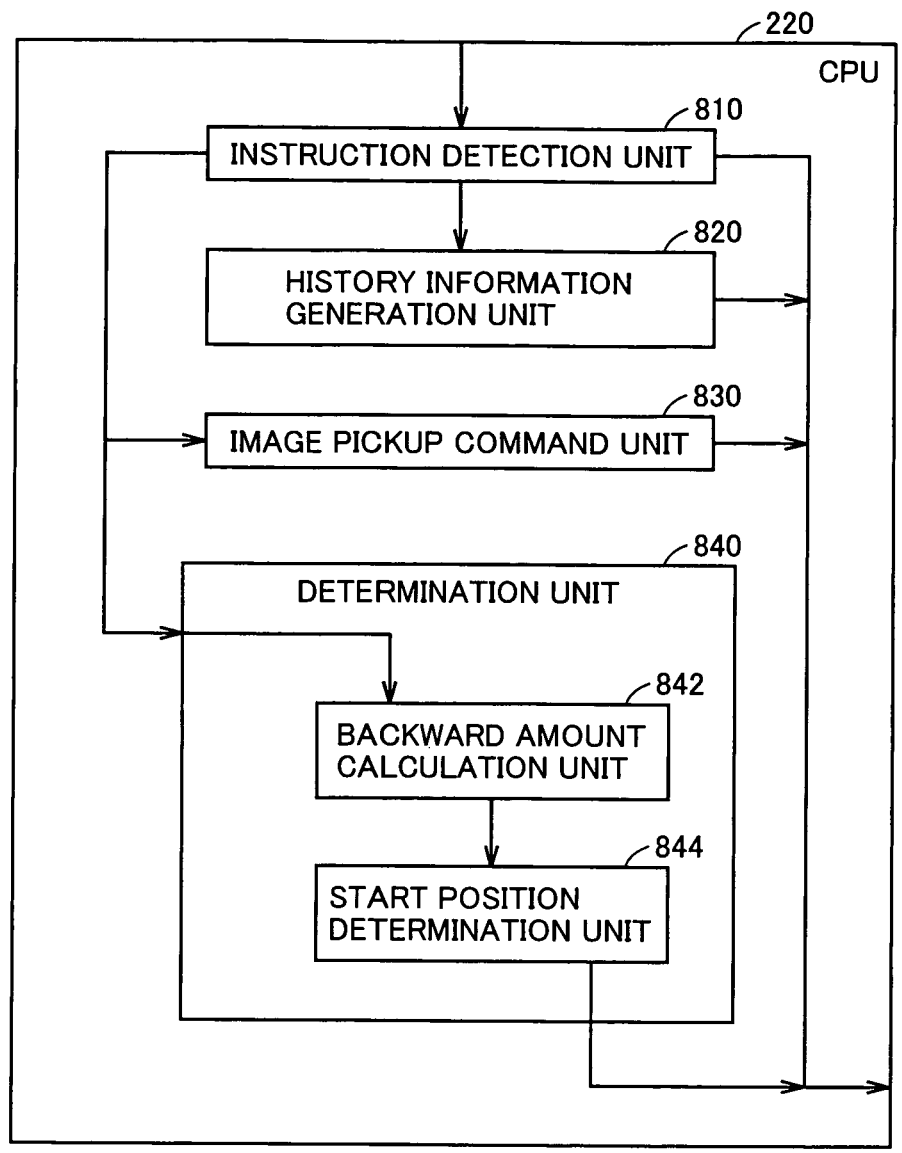
FIG. 8 is a block diagram showing a functional configuration implemented by a CPU 220.

Referring to FIG. 8, CPU 220 is described that implements television 200 in the present embodiment. FIG. 8 is a block diagram showing a functional configuration implemented by CPU 220. Each function is implemented, for example, by CPU 220 executing a program for realizing each function, and implemented as a cooperative operation of software and hardware.

CPU 220 includes an instruction detection unit 810 detecting instructions to television 200, for example, an instruction to reproduce contents and an instruction to end the reproduction, a history information generation unit 820 generating, in response to the instruction detected by instruction detection unit 810, information representing a viewing history of a viewer, an image pickup command unit 830 outputting to camera 260 a command to pick up an image of a subject in a range set in advance, based on the instruction (including instruction to reproduce, instruction to end reproduction and instruction to pick up an image) detected by instruction detection unit 810, and a determination unit 840 for determining, in response to the instruction detected by instruction detection unit 810, the position to start reproduction of contents to be reproduced.

Determination unit 840 includes a backward amount calculation unit 842 for calculating a backward amount for the position to reproduce contents, based on the instruction to reproduce and the history information, and a start position determination unit 844 for determining the position to reproduce contents that precedes by the backward amount calculated by backward amount calculation unit 842.

Figure 9:
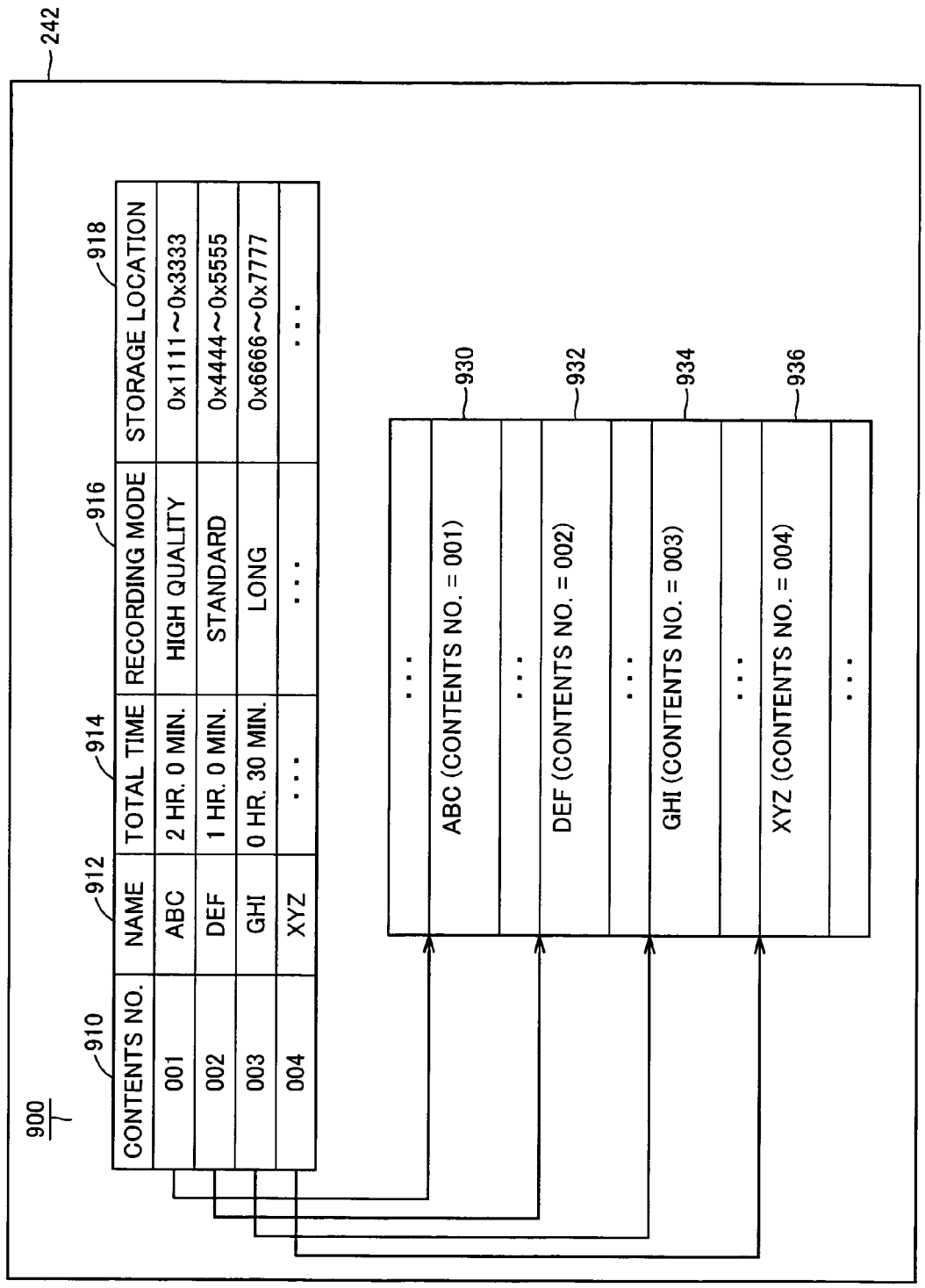
FIG. 9 shows one form of data storage in an HDD 242 of television 200.

Referring to FIG. 9, a data structure of television 200 in the present embodiment is described. FIG. 9 shows one form of storage of data in HDD 242 of television 200. HDD 242 includes a table 900 where data representing details of contents is stored. Table 900 includes regions 910 to 918 for storing data. HDD 242 further includes regions 930 to 936 for storing contents data.

The contents number specifying contents recorded in HDD 242 is stored in region 910. The name of the contents is stored in region 912. The total time required for reproducing contents is stored in region 914. Information representing the recording mode of recorded contents is stored in region 916. The storage location for specifying the position where the contents are stored is stored in region 918.

The data stored in regions 910 to 918 are associated with each other. Therefore, as the contents number stored in region 910 is specified for example, other data are all specified.

Referring again to FIG. 9, the contents (named "ABC") with the contents number "001" for example is stored in region 930. Thus, as a viewer of television 200 designates the name of contents (region 912), the data corresponding to the contents is read from HDD 242, the video signal processing as described above is performed on the data, and the resultant data is shown on display 238.

Figure 10:
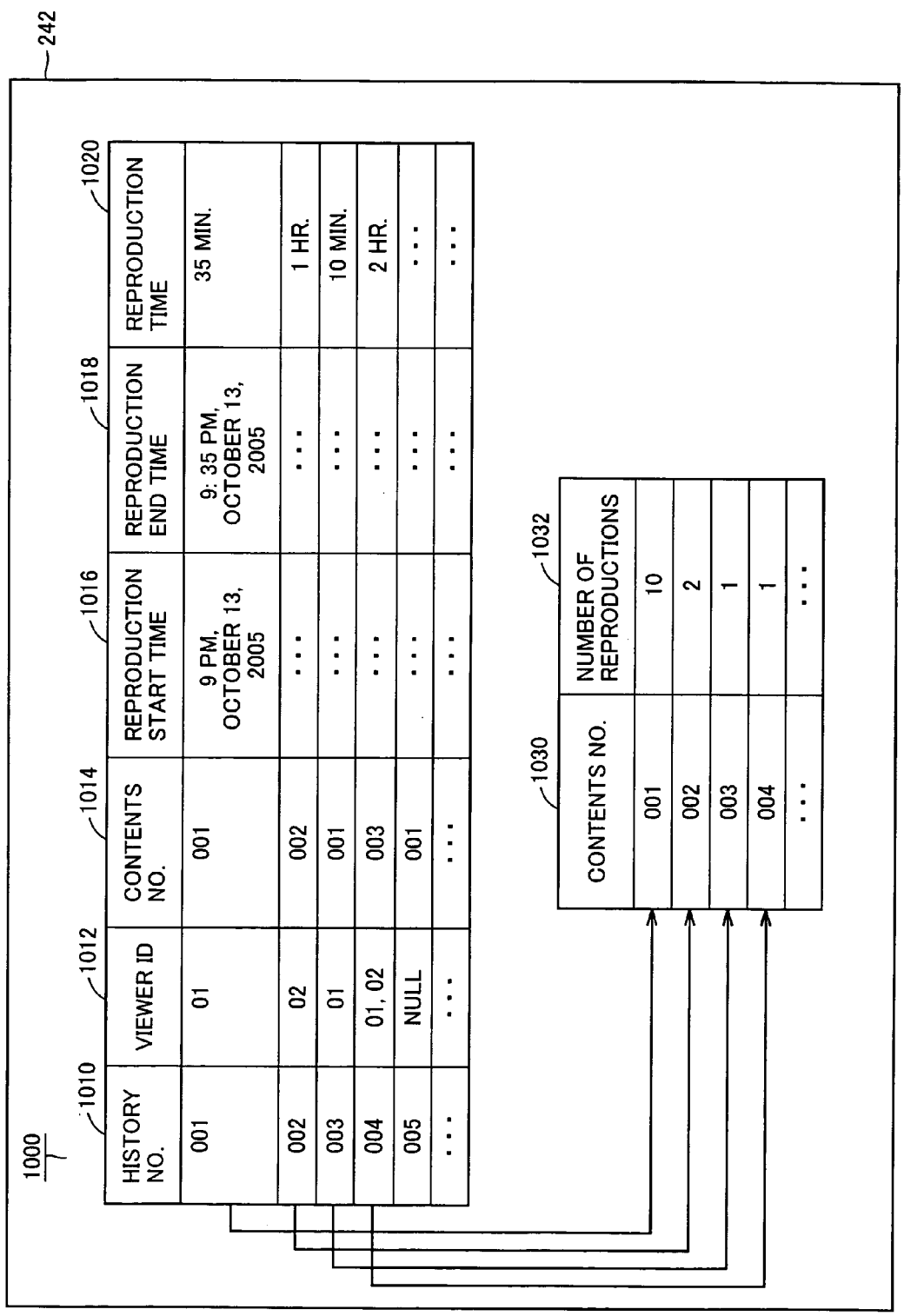
FIG. 10 conceptually shows a viewing history of contents.

Referring to FIG. 10, the data structure of television 200 is further described. FIG. 10 conceptually shows a contents viewing history. HDD 242 includes a table 1000 having the viewing history. Table 1000 includes regions 1010 to 1020 for storing data. HDD 242 further includes regions 1030, 1020 for storing information, contents by contents, regarding the number of times reproduction of the contents is performed. The contents viewing history is recorded as a reproduction history of each viewer of the contents.

A history number counted up successively in response to reproduction of contents by television 200 is stored in region 1010. A viewer ID (Identification) for specifying a viewer who viewed the reproduced contents is stored in region 1012. A contents number for specifying the reproduced contents is stored in region 1014. The time when reproduction of the contents is started and the time when the reproduction of the contents is ended are stored in regions 1016, 1018 respectively. The period of time for which reproduction of the contents is done is stored in region 1020. The data stored in regions 1010 to 1020 are associated with each other. Thus, by specifying the data in region 1010, the data stored in other regions are extracted.

Here, the number of viewers associated with the history is not limited to one. For example, in the case where a plurality of viewers are registered in advance and all viewers view the contents, the history may be stored in HDD 242 as the history of a plurality of viewers as indicated at history number "004". In contrast, in the case where a non-registered viewer views contents, the viewer ID may be blank (NULL in the data) as indicated at history number "005". In this case, the viewer may be registered after viewing and then the data may be allowed to be entered in the history.

Further, the number of times reproduction of contents is done is stored in region 1032. The reproduction time is associated with each contents number (region 1030). Here, the contents number stored in region 1014 and the contents number stored in region 1030 correspond to each other. Therefore, any contents number may be designated to read the number of times reproduction of the contents is done.

It is noted that the manner of storage of the viewing history is not limited to the one shown in FIG. 10. For example, the data concerning the number of times reproduction is done that is stored in regions 1030, 1032 may be calculated one by one based on the data in regions 1010 to 1020 as required.

Figure 11:
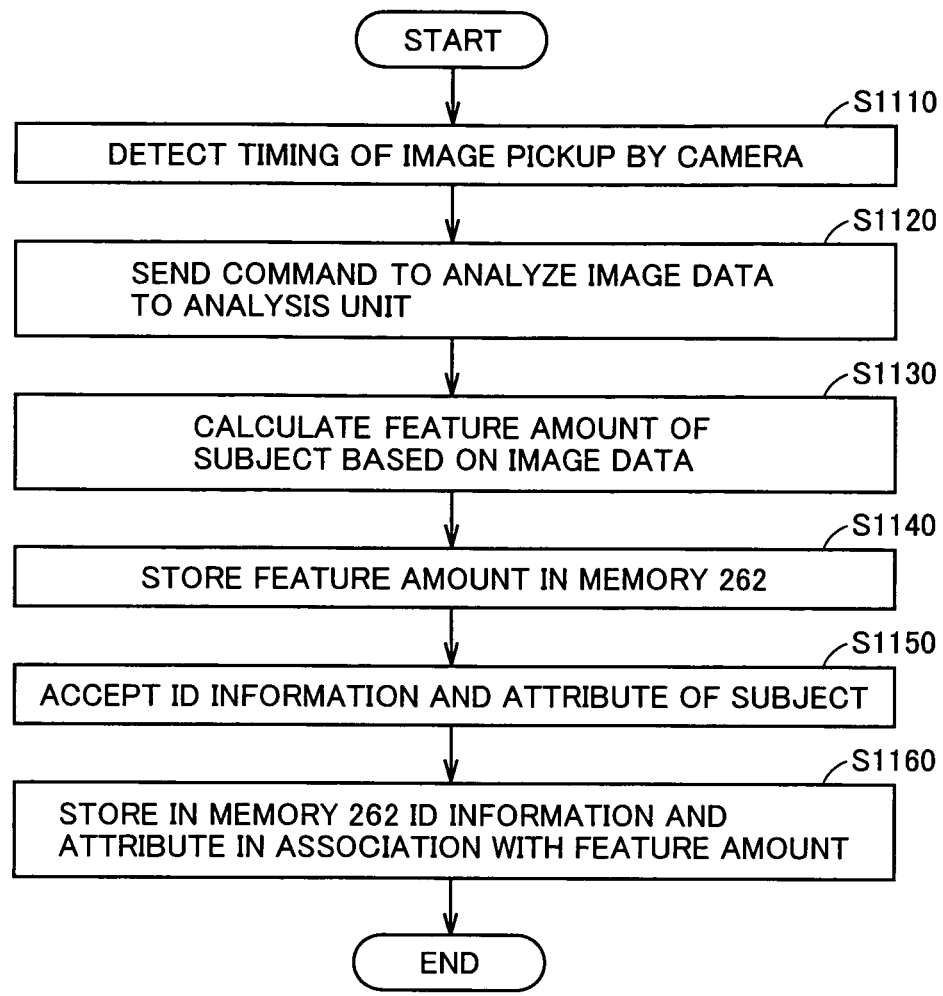
FIG. 11 is a flowchart showing a procedure of processes executed by CPU 220 and an analysis unit 270 for picking up an image by means of a camera 260.

Referring to FIGS. 11 to 14, a control structure of television 200 in the present embodiment is described. FIG. 11 is a flowchart showing a procedure of processes executed by CPU 220 and analysis unit 270 for executing the image pickup operation by camera 260.

In step S1110, CPU 220 detects the timing of image pickup by camera 260 based on a remote control signal received by light-receiving unit 210. In step S1120, CPU 220 sends to analysis unit 270 a command to analyze image data of a subject with its image picked up by camera 260. In step S1130, analysis unit 270 calculates a feature amount of the subject based on the image data stored in memory 262. In step S1140, CPU 220 stores the calculated feature amount in another region reserved in advance in memory 262.

In step S1150, CPU 220 accepts, based on information included in any input via operation unit 210 or the signal received by light-receiving unit 212, input of identification information and an attribute of the subject with its image picked up by camera 260. The identification information is information represented by alphanumeric characters or other characters for identifying a viewer registered in television 200. The attribute refers to a set value, for each subject, concerning reproduction of contents that is input by a viewer of television 200. The set value includes for example a set value of the backward amount for bringing the contents backward to reproduce contents as described hereinlater or the age, sex for example of the viewer. In step S1160, CPU 220 associates the identification information and attribute with the feature amount calculated in step S1130 to store it in a region reserved in advance in memory 262. Thus, the registration of the viewer of television 200 is completed.

Figure 12:
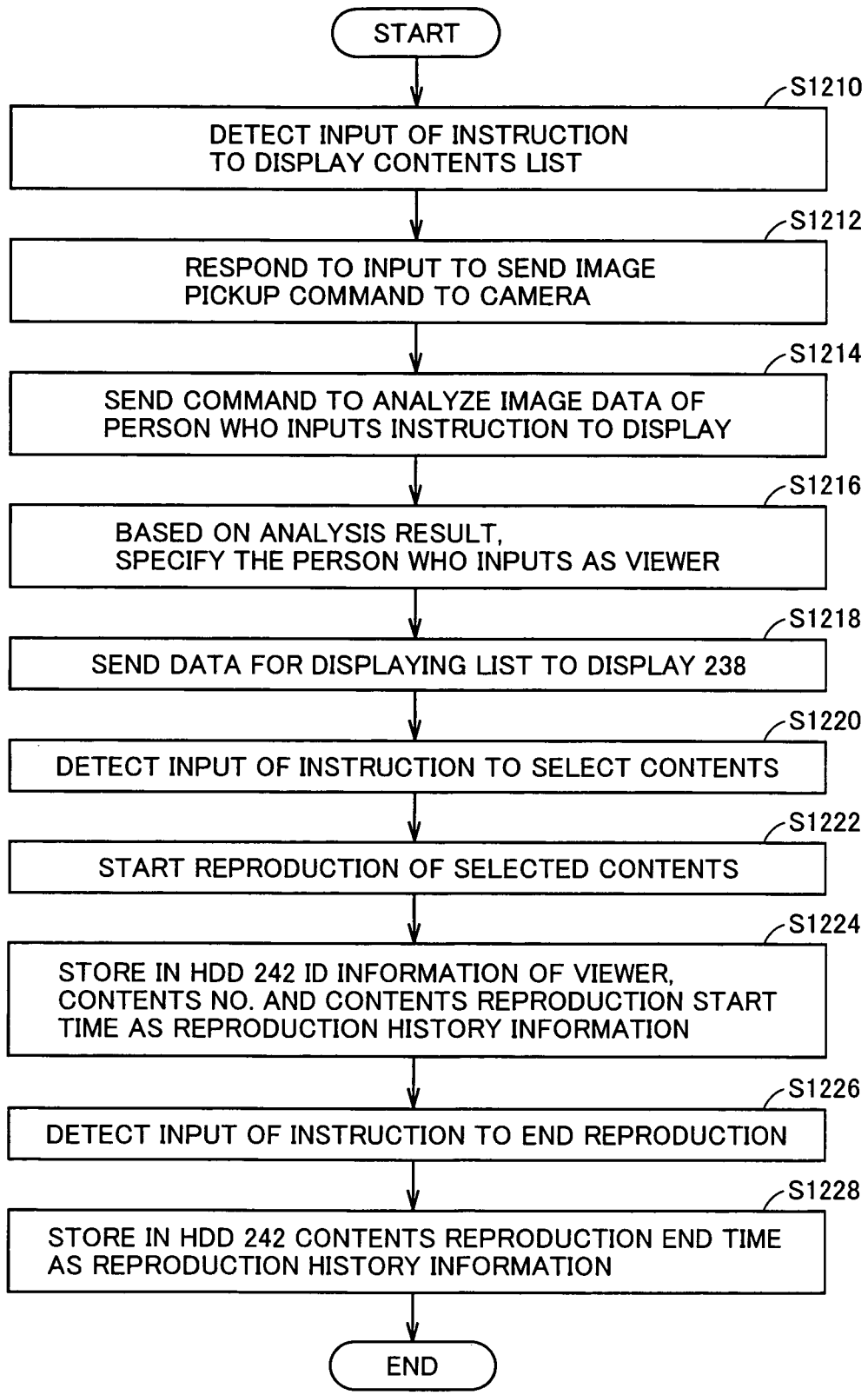
FIG. 12 is a flowchart showing a procedure of processes executed by CPU 220 for reproducing contents.

FIG. 12 is a flowchart showing a procedure of processes executed by CPU 220 for reproducing contents.

In step S1210, CPU 220 detects, based on a signal from light-receiving unit 212, input of an instruction to display a contents list. In step S1212, CPU 220 sends, in response to the input, a command to pick up an image to camera 260. Camera 260 picks up an image of a pickup range of camera 260 in response to the command. For example, an image of a subject is picked up. In step S1214, CPU 220 sends to analysis unit 270 a command to analyze image data of the person who entered the instruction to display the list. In response to the command, analysis unit 270 analyzes the image data stored in memory 262. By this analysis, a feature amount of the subject with its image picked up by camera 260 is calculated.

In step S1216, based on the result of the analysis, CPU 220 specifies the person who entered the instruction as a registered viewer. In step S1218, CPU 220 sends data representing the list to display 238. Display 238 displays the list of reproducible contents stored in HDD 242.

In step S1220, based on a signal from operation unit 210 or light-receiving unit 212, CPU 220 detects input of an instruction for selecting any contents from contents included in the list. In step S1222, in response to the input of the instruction, CPU 220 sends to record/reproduction unit 240 a command to read data of contents stored in HDD 242. Record/reproduction unit 240 reads the data of the contents and sends it to video signal processing circuit 230. As video signal processing circuit 230 sends the data of the contents to driver 236, the contents are shown on display 238. Thus, reproduction of contents is started. In step S1224, based on an instruction to select contents detected in step S1220 and time information from clock circuit 224 for example, CPU 220 stores as reproduction history information in HDD 242, the ID information of the viewer, the contents number and the start time of the contents reproduction.

In step S1226, CPU 220 detects, based on a signal from operation unit 210 or light-receiving unit 212, input of an instruction to end reproduction of contents having been reproduced. In response to the detection of the instruction, CPU 220 commands record/reproduction unit 240 to end reading of data of the contents. Thus, reproduction of the contents is ended. In step S1228, CPU 220 stores the time when the reproduction of the contents is ended, as the reproduction history information, in a region reserved in HDD 242.

Figure 13:
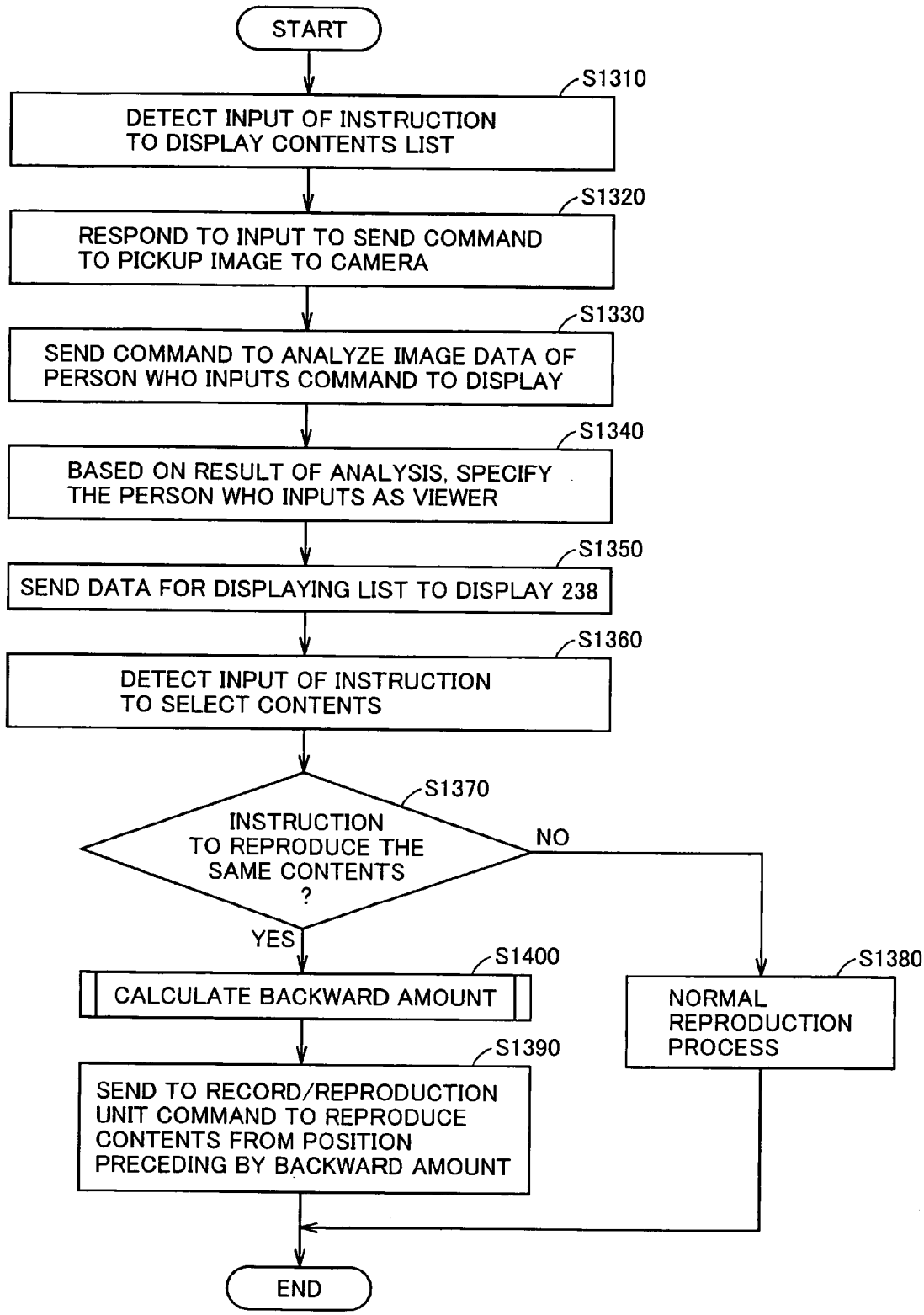
FIG. 13 is a flowchart showing a procedure of processes executed by CPU 220 when reproduction of contents is resumed.

FIG. 13 is a flowchart showing a procedure of processes executed by CPU 220 when reproduction of contents is resumed. This process is implemented, for example, in the case where the capability of restarting reproduction from the position where reproduction is stopped, namely the resume capability is set active.

In step S1310, based on a signal from operation unit 210 or light-receiving unit 212, CPU 220 detects input of an instruction to display a contents list. In step S1320, in response to the input, CPU 220 sends a command to pick up an image to camera 260. In response to the command, camera 260 picks up an image of a subject present in a range where the image can be picked up. In this way, an image of the viewer of television 200 is picked up. Data generated by the image pickup is written in a region reserved in memory 262.

In step S1330, CPU 220 sends to analysis unit 270 a command to analyze the image data of the person who entered the instruction to display. In response to this command, analysis unit 270 reads the data stored in memory 262 and executes an analysis process which is set in advance to calculate from the image data a feature amount of the viewer. The result of the calculation is stored in another region reserved in memory 262.

In step S1340, based on the result of the analysis stored in memory 262 and viewer information stored in HDD 242, CPU 220 specifies the person who entered the instruction to display. In step S1350, CPU 220 sends to display 238 data for displaying the contents list. Thus, the list is shown on display 238. In step S1360, based on a signal from operation unit 210 or light-receiving unit 212, CPU 220 detects input of an instruction to select contents reproducible by television 200. The detection is made by a comparison between a contents number included in the signal input to CPU 220 and the contents number stored in HDD 242. In step S1370, CPU 220 determines whether or not the entered instruction is an instruction to reproduce the same contents. When CPU 220 determines that the instruction is an instruction to reproduce the same contents (YES in S1370), the process proceeds to step S1400. Otherwise (NO in S1370), the process returns to S1380.

In step S1380, CPU 220 performs the normal reproduction process. Here, "normal" refers to a reproduction process in the manner in which the position to start reproduction of contents is not changed. For example, in the case where only the so-called resuming capability is set active while the capability of going backward to a position from which reproduction is restarted is set inactive, reproduction of the contents is resumed from the position where the reproduction was stopped. If the resuming capability itself is set inactive, the contents are reproduced again from the beginning of the contents.

In step S1400, CPU 220 executes a process of calculating a backward amount as described hereinlater. When this process is performed, according to the viewer entered the instruction to reproduce in the case where the same contents are to be reproduced, a backward amount is calculated for bringing backward the position where reproduction is started. In step S1390, CPU 220 sends to record/reproduction unit 240 an instruction to reproduce contents from the position preceding by the backward amount. In response to this command, record/reproduction unit 240 starts the reproduction of contents from the position which precedes the position where the reproduction was stopped.

Figure 14:
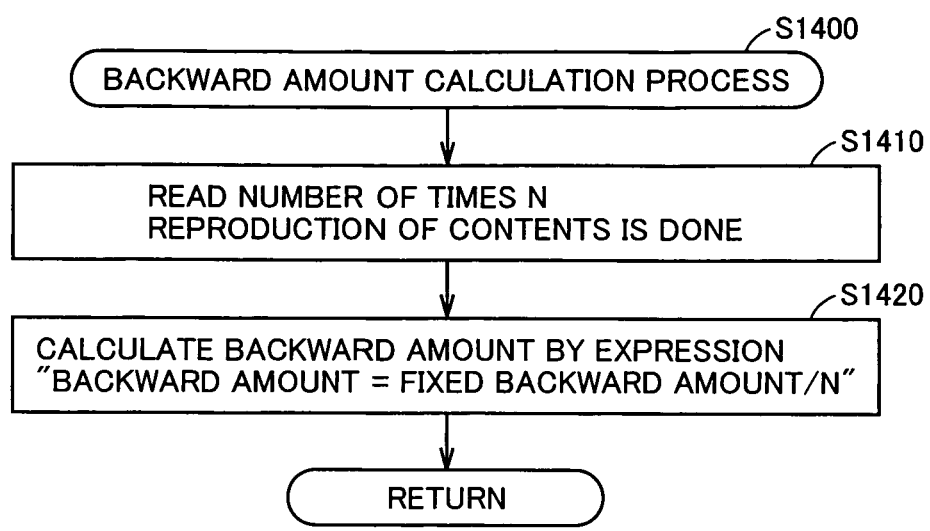
FIG. 14 is a flowchart showing a procedure of processes executed by CPU 220 for calculating a backward amount.

FIG. 14 is a flowchart showing a procedure of processes executed by CPU 220 for calculating a backward amount. In step S1410, CPU 220 reads from region 1032 of HDD 242 the number of times N reproduction of contents is performed. In step S1420, CPU 220 calculates the backward amount by the expression "backward amount=fixed backward amount/N". Here, "fixed backward amount" refers to a fixed value of the backward amount that is set in advance. When such an expression is used to calculate the backward amount, the backward amount is calculated according to the number of times N reproduction of the contents is done. After this, the process returns to the main process. Television 200 accordingly reproduces the contents from the position brought backward according to the backward amount.

As discussed above, television 200 in the present embodiment includes an apparatus of recording and reproducing video and audio as well as an image pickup apparatus and a face recognition apparatus for a subject. Television 200 calculates a feature amount of a viewer and stores identification information together with the feature amount of the viewer. According to reproduction of contents, television 200 stores a reproduction history. The reproduction history is associated with the viewer. When the same viewer enters again an instruction to reproduce the contents already reproduced in the past, television 200 searches the reproduction history of the viewer to determine the position where reproduction of the contents is carried out. The position may be determined as a position brought back by a backward amount which is set in advance for each viewer or may be calculated according to the number of times the contents have been viewed.

The start position is brought backward to reproduce contents, which facilitates viewer's remembering of details of the contents whose reproduction was stopped halfway. Accordingly, the viewer can enjoy viewing contents stress-free.

First Modification

In the following, a first modification of the present embodiment is described. A contents reproduction apparatus according to the modification differs from the above-described embodiment in that the apparatus calculates a backward amount according to the time elapsed from the last reproduction of contents.

It is noted that the contents reproduction apparatus in the present modification is implemented by a hardware configuration similar to that of the above-described contents reproduction apparatus. Further, capabilities thereof are identical as well. Therefore, the description of the hardware configuration is not repeated here. The contents reproduction apparatus is hereinafter described as the one implemented by television 200. Specifically, it is implemented by changing the program executed by CPU 220 for example.

Figure 15:
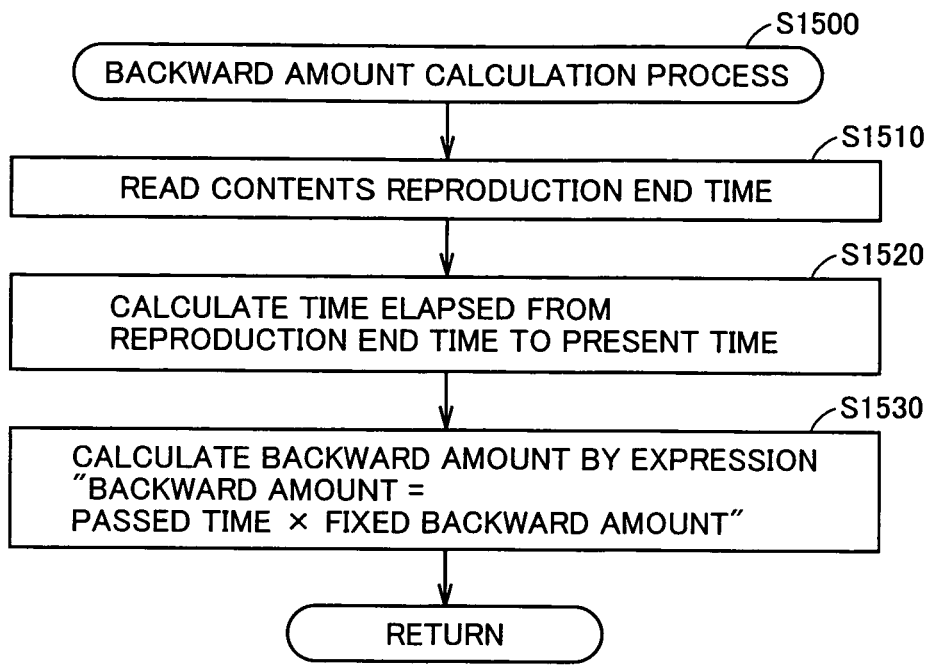
FIG. 15 is a flowchart showing a procedure of processes executed by the CPU of television 200 according to a first modification of the first embodiment.

Referring to FIG. 15, a description is given of a control structure of the contents reproduction apparatus in the present modification. FIG. 15 is a flowchart showing a procedure of processes executed by a CPU of television 200 that is one form of the contents reproduction apparatus. In step S1510, CPU 220 reads, from table 1000 stored in HDD 242, the time of ending reproduction of contents (region 1018). In step S1520, CPU 220 calculates, based on the reproduction-ended time and time information from clock circuit 224, the time elapsed from the reproduction-ended time to the present time. In step S1530, CPU 220 calculates a backward amount by means of an expression "backward amount=elapsed time× fixed backward amount". Here, "fixed backward amount" refers to a backward amount set in advance for unit time. Thus, depending on the time elapsed from the time when the last reproduction was ended, the start position as brought backward is determined.

In this way, the contents reproduction apparatus in the present modification calculates the backward amount which is calculated when the same contents are to be reproduced, according to the time elapsed from the time when the last reproduction was ended. Therefore, as the elapsed time is longer, the backward amount is larger. Accordingly, even in the case where a long time has elapsed since the last viewing, the viewer of the contents can easily remember details of the contents.

Second Modification

A second modification of the present embodiment is hereinafter described. A contents reproduction apparatus in the present modification differs from the contents reproduction apparatuses described above in that the present apparatus calculates a backward amount according to the time for which contents are reproduced. It is noted that the contents reproduction apparatus in the present modification has the same hardware configuration as the contents reproduction apparatus of the above-described embodiment. The capabilities thereof are identical as well. Therefore, the description thereof is not repeated here.

Figure 16:
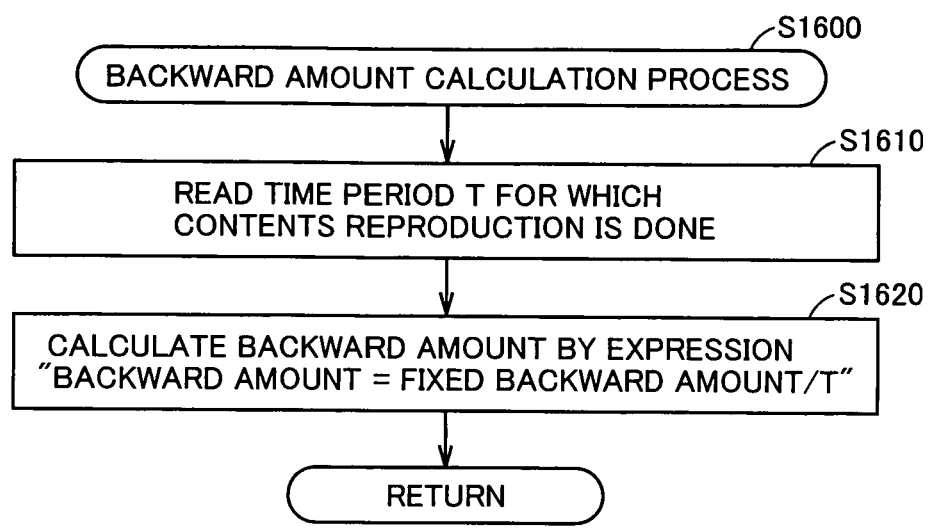
FIG. 16 is a flowchart showing a procedure of processes executed by CPU 220 of television 200 according to a second modification of the first embodiment.

Referring to FIG. 16, a control structure of the contents reproduction apparatus in the present modification is described. FIG. 16 is a flowchart showing a procedure of processes executed by CPU 220 for calculating a backward amount.

In step S1610, CPU 220 reads, from region 1020 of HDD 242, a period of time T for which contents are reproduced. In step S1620, CPU 220 calculates the backward amount by means of an expression "backward amount=fixed backward amount/T". Here, "fixed backward amount" refers to a maximum value defining the amount by which the reproduction start position is brought backward. By setting the fixed backward amount, the backward amount can be prevented from being excessively large even in the case where time T for which reproduction was performed is short.

As discussed above, the contents reproduction apparatus in the present modification provides a larger backward amount as calculated as the time for which contents are reproduced is shorter, and provides a smaller backward amount as calculated as the time for which contents are reproduced is longer. If a viewer viewed contents for a relatively short time, details of the contents may not be kept well in memory of the viewer. Therefore, a larger backward amount is provided to help the viewer remembering the details. In contrast, if a viewer viewed contents for a relatively long time, details of the contents may be kept well in memory. Therefore, the viewer will easily remember the details of the contents when reproduction is resumed without a longer backward amount. In addition, the time for reproducing contents corresponding to the backward amount is shorter, the viewer does not take time more than necessary. In this way, reproduction can be performed according to the viewing time of the viewer, and thus the contents reproduction apparatus can be improved in terms of convenience.

Third Modification

In the following, a third modification of the present embodiment is described. A contents reproduction apparatus in the present modification differs from the contents reproduction apparatuses described above in that the backward amount is calculated according to the number of times reproduction of contents is performed. It is noted that the contents reproduction apparatus in the present modification has the same hardware configuration as that of the contents reproduction apparatus in each modification of the embodiment described above. They have the same capabilities as well. Therefore, the description thereof is not repeated here.

Figure 17:
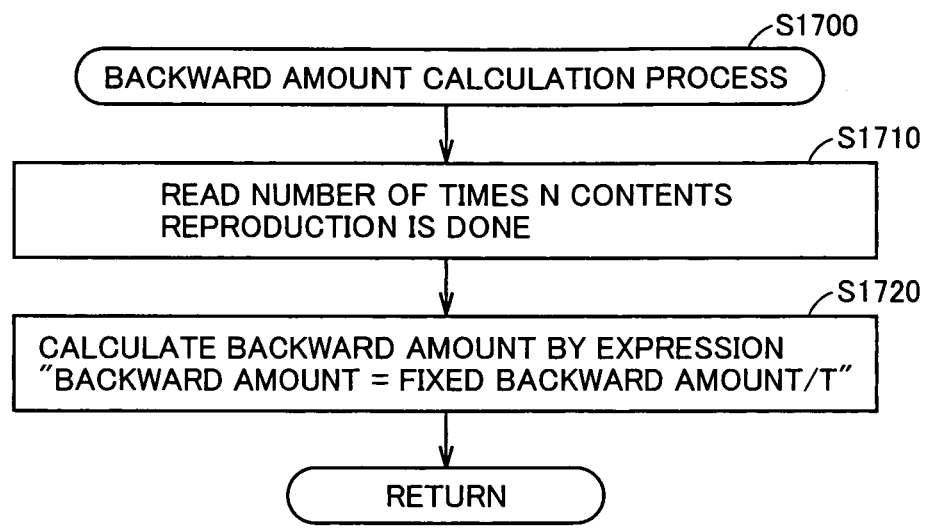
FIG. 17 is a flowchart showing a procedure of processes executed by CPU 220 of television 200 according to a third modification of the first embodiment.

Referring to FIG. 17, a control structure of the contents reproduction apparatus in the present modification is described. FIG. 17 is a flowchart showing a procedure of processes executed by CPU 220 for calculating a backward amount.

In step S1710, CPU 220 reads, from region 1032 (FIG. 10) of HDD 242, the number of times N reproduction of contents is performed. In step S1720, CPU 220 calculates the backward amount by means of an expression "backward amount=fixed backward amount/N". After this, the contents reproduction apparatus starts reproduction of the contents for which an instruction to reproduce is given, from a position brought backward by the calculated backward amount.

As discussed above, the contents reproduction apparatus in the present modification provides a smaller backward amount as the number of times N reproduction is done is larger. Regarding the contents reproduced relatively larger number of times, it is highly possible that details of the contents are well in memory of the viewer. In contrast, regarding the contents reproduced relatively smaller number of times, it is highly possible that details of the contents are not well in memory of the viewer. Accordingly, a larger backward amount is provided for contents reproduced relatively smaller number of times while a smaller backward amount s provided for contents reproduced relatively larger number of times. Thus, reproduction can be performed according to the extent to which the viewer keeps the contents in memory.

Second Modification

In the following, a second embodiment of the present invention is described. A contents reproduction apparatus in the present embodiment differs from that of the first embodiment in that the former has the capability of calculating a backward amount according to a data structure of a signal to be reproduced. It is noted that the contents reproduction apparatus in the present embodiment has the same hardware configuration as the contents reproduction apparatus of the first embodiment. They have the same capabilities as well. Therefore, the description thereof is not repeated here.

Figure 18:
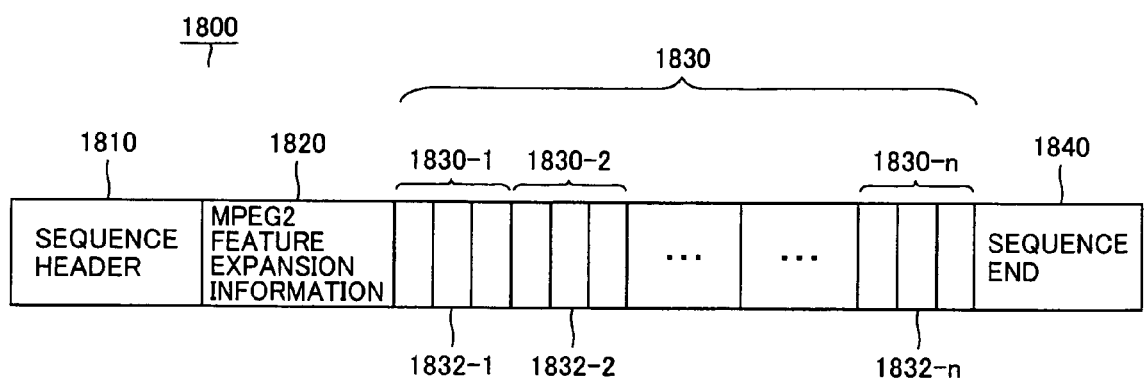
FIG. 18 conceptually shows a structure of MPEG data.

Referring to FIG. 18, a description is given of a signal reproduced by the contents reproduction apparatus in the present embodiment. FIG. 18 conceptually shows a structure of an MPEG (Motion Picture Experts Group) signal 1800. MPEG signal 1800 includes a sequence header 1810, an MPEG2 feature expansion information 1820, GOPs (Group of Pictures) 1830-1, 1830-2, . . . 1830-$n$ (denoted collectively as GOP 1830), and a sequence end 1840. GOPs 1830-1 and 1830-2 include I-pictures 1832-1, 1832-2. The same is applied to other GOPs.

When the video signals having this structure is reproduced by the contents reproduction apparatus, I-pictures included in the signals are detected successively. Each I-picture is analyzed by an analysis unit (CPU for example) of the contents reproduction apparatus and the correlation between the I-picture and its preceding and following I-pictures is detected.

Figure 19:
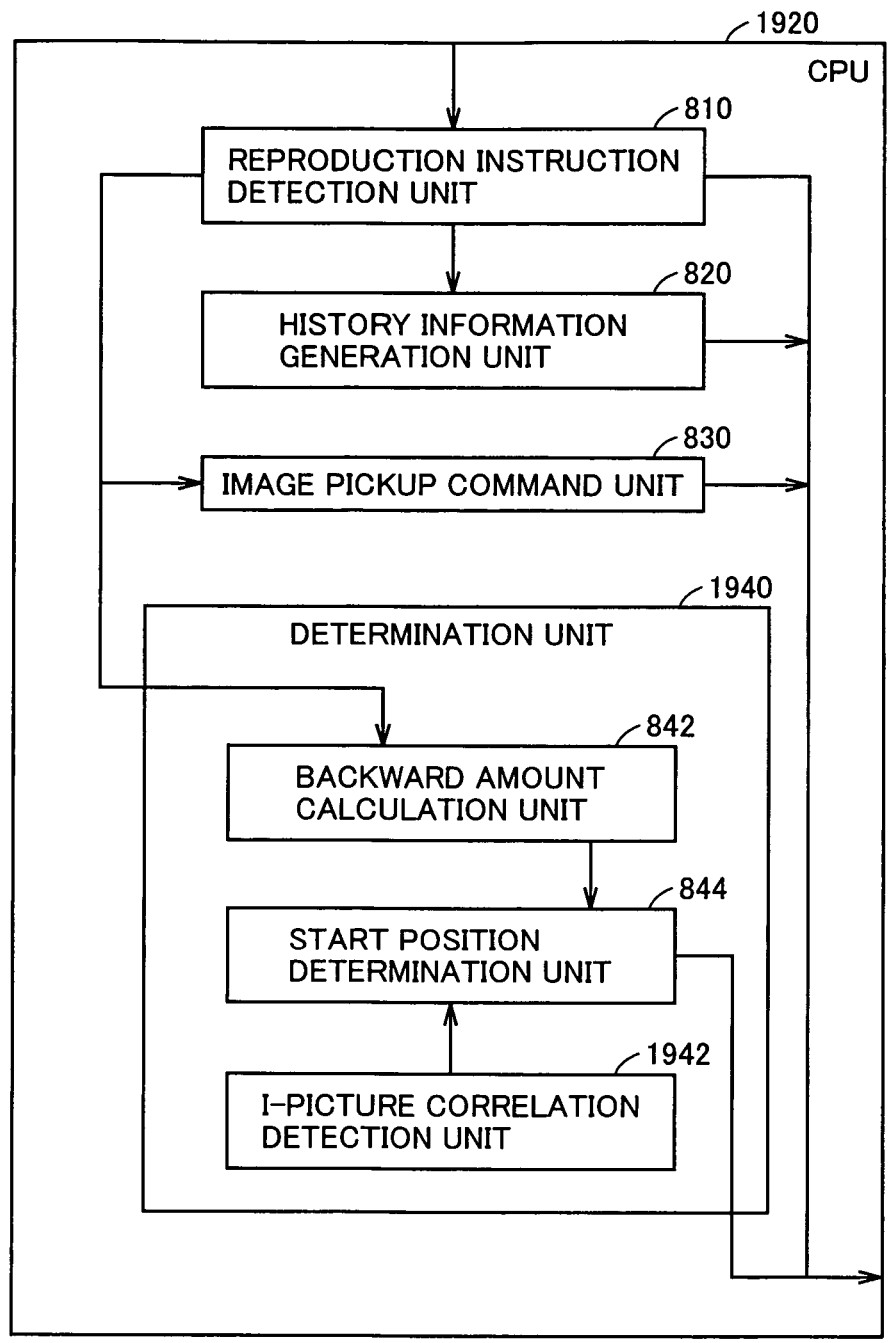
FIG. 19 is a block diagram showing a functional configuration of a CPU 1920 implementing a contents reproduction apparatus according to a second embodiment of the present invention.

Referring to FIG. 19, a CPU 1920 implementing the contents reproduction apparatus in the present embodiment is described. FIG. 19 is a block diagram showing a functional configuration of CPU 1920.

CPU 1902 includes, as compared with the configuration shown in FIG. 8, a determination unit 1940 instead of determination unit 840. Determination unit 1940 includes, in addition to backward amount calculation unit 842 and start position determination unit 844, an I-picture correlation detection unit 1942 for detecting whether or not there is I-picture correlation of the video signal reproduced by record/reproduction unit 240. It is noted that the process of detecting whether or not there is I-picture correlation can be understood by those skilled in the art. Therefore, a description of the process is not given here.

Figure 20:
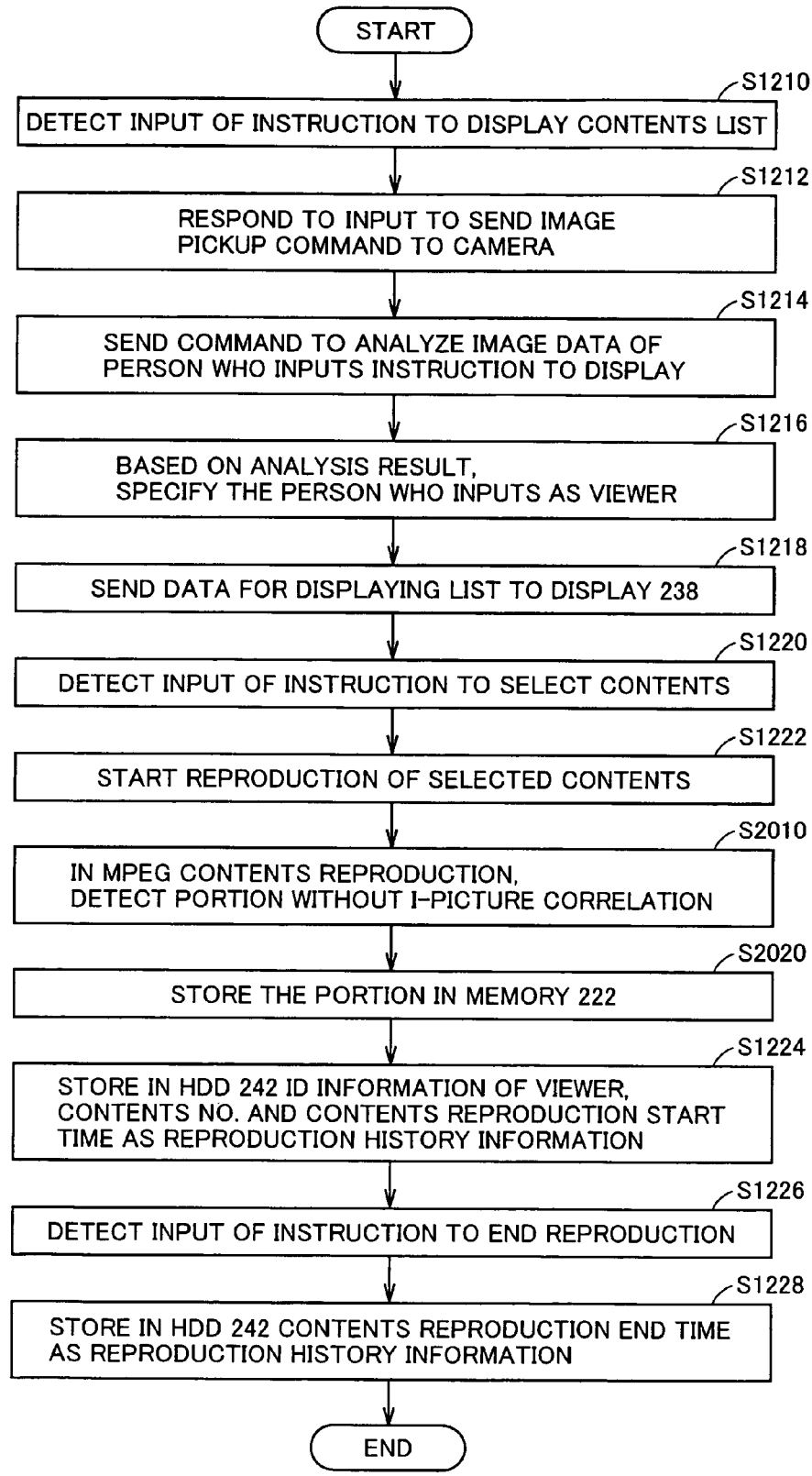
FIG. 20 is a flowchart showing a procedure of processes executed by CPU 1920.

Referring to FIG. 20, a description is given of a control structure of the contents reproduction apparatus in the present embodiment. FIG. 20 is a flowchart showing a procedure of processes executed by CPU 1920. It is noted that the same process steps as those in the first embodiment are denoted by the same step number. Therefore, the description thereof is not repeated here.

In step S2010, CPU 1920 detects a portion where no I-picture correlation is found in reproducing MPEG contents. In step S2020, CPU 1920 stores the detected portion in a region reserved in advance in memory 222. After this, reproduction of the MPEG contents is continued until an instruction to end is input. In memory 222, information about the portion where the I-picture correlation is absent as detected in step S210 is stored.

In this case, all of those portions without I-picture correlation may not be stored in memory 222. For example, the upper limit of the number of such portions as stored may be set. In the case where a new portion is detected as MPEG contents are reproduced, older portions may be deleted successively. In this way, increase in data in memory 222 can be prevented and it can be prevented that a backward amount is calculated that brings the reproduction start position backward more than necessary. The result of detection is read by CPU 220 from memory 222 and written to HDD 242.

Figure 21:
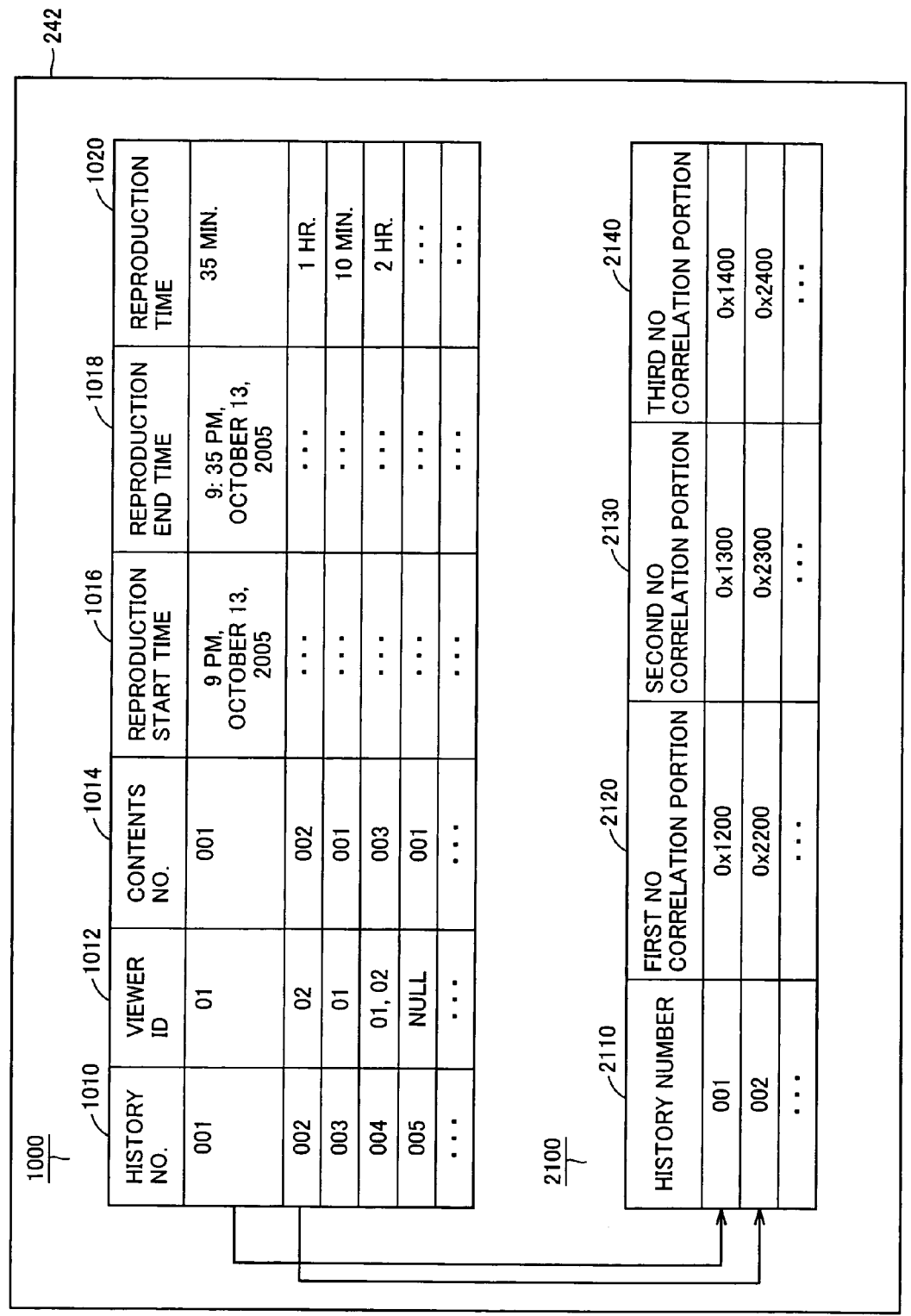
FIG. 21 shows one form of data storage in an HDD 242.

Referring to FIG. 21, a data structure of the contents reproduction apparatus in the present embodiment is described. FIG. 21 shows one form of data storage in HDD 242. HDD 242 includes, in addition to table 1000 shown in FIG. 10, a table 2100 for storing information about portions where there is no I-picture correlation. Table 2100 includes regions 2110 to 2140 where data is stored.

A history number for specifying a history of reproduction of contents is stored in region 2100. Data for representing portions where no I-picture correlation is present as detected in step S2010 are stored in regions 2120 to 2140. The data is an address for example in HDD 242.

The history number stored in region 1010 and the history number stored in region 2110 correspond to each other. Therefore, in the case where an instruction to resume reproduction of contents is entered, the history number stored in region 1010 can be specified to easily confirm whether there is a portion without I-picture correlation in the contents associated with the history.

Figure 22:
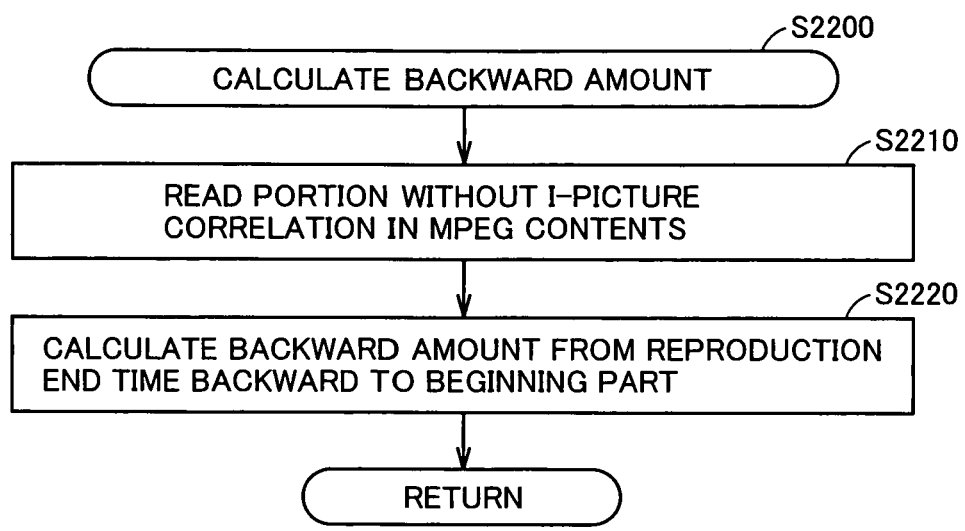
FIG. 22 is a flowchart showing a procedure of processes executed by CPU 1920 implementing the contents reproduction apparatus according to the second embodiment of the present invention.

Referring to FIG. 22, a control structure of the contents reproduction apparatus in the present embodiment is described. FIG. 22 is a flowchart showing a procedure of processes executed by CPU 1920 implementing the contents reproduction apparatus.

In step S2210, CPU 1920 reads a portion without I-picture correlation in MPEG contents. In step S2220, CPU 1920 calculates, as a backward amount, an amount by which the reproduction-ended time, which is included in the reproduction history information, is brought backward to the first portion where I-picture correlation is absent. The backward amount is calculated and then record/reproduction unit 240 reproduces the contents from the position preceding the time when the last reproduction is ended. Here, the position where the reproduction is newly started is located in a portion where there is no correlation with a preceding picture.

In this way, the contents reproduction apparatus in the present embodiment calculates, for each viewer, a backward amount for a start position according to the degree of correlation of scenes of contents for which an instruction to reproduce is given. When contents are thus reproduced, the viewer can view a relevant scene from the beginning thereof. Thus, the viewer can enjoy viewing the contents while recalling details of the contents whose reproduction was stopped halfway.

The description of the embodiments each and the modifications each has been given supposing that the device for recognizing a viewer is of television 200. However, the device may not be included in television 200. The device may be any that has the capability of picking up an image of a viewer and analyzing image data, in response to commands from television 200.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for reproducing contents, comprising:
   an image pickup unit picking up an image of a subject to output an image signal;
   a calculation unit performing a predetermined analysis process based on said image signal to calculate a feature amount of said subject;
   an identification information storage unit storing identification information of said subject and said feature amount associated with said identification information;
   a storage unit storing contents;
   a reproduction unit reproducing contents;
   an input unit accepting input of an instruction;
   a generation unit generating, based on input of a first instruction to reproduce contents, reproduction history information representing a history of reproduction of said contents;
   a history storage unit storing said reproduction history information;
   an image pickup control unit causing, based on input of a second instruction to reproduce said contents, said image pickup unit to pick up an image of a subject who inputs said second instruction;
   a determination unit determining, based on input of said second instruction and said reproduction history information, a start position where reproduction of said contents is started according to said subject; and
   a reproduction control unit reproducing said contents from said start position
   wherein the determination unit includes:
      a calculation unit calculating a backward amount with respect to an end position where reproduction of the contents is ended, based on a history of viewing by the subject who inputs the second instruction and a fixed backward amount, and
      a start position determination unit determining, as the start position, a position preceding the end position by the backward amount.

2. The apparatus according to claim 1, wherein said generation unit generates said reproduction history information based on a feature amount of a subject who inputs said first instruction, contents identification information for identifying the contents for which said instruction to reproduce is input, and information for specifying an end position where reproduction of said contents is ended.

3. The apparatus according to claim 1, further comprising
a confirmation unit confirming, based on a feature amount of said subject whose image is picked up in response to the input of said second instruction, whether said reproduction history information is present in said history storage unit,
wherein if said reproduction history information is present in said history storage unit, said calculation unit calculates said backward amount based on the history of viewing by said subject who inputs said second instruction.

4. The apparatus according to claim 1,
wherein said reproduction history information includes the number of times the reproduction of said contents is performed N, and said calculation unit calculates said backward amount based on said number of times N, and
wherein the backward amount equals the fixed backward amount divided by the number of times N.

5. The apparatus according to claim 1, wherein
said reproduction history information includes a time elapsed from the last reproduction of the contents, and
the backward amount equals the elapsed time multiplied by the fixed backward amount.

6. The apparatus according to claim 1, wherein
said reproduction history information includes a time period T for which reproduction of said contents is performed, and said calculation unit calculates said backward amount according to the time period T, and
the backward amount equals the fixed backward amount divided by the time period T.

7. The apparatus according to claim 6, wherein said storage unit stores a total time period required for reproduction of said contents, and said calculation unit calculates said backward amount according to a ratio between said time period T for which reproduction of said contents is performed and said total time period.

8. The apparatus according to claim 1, further comprising
a backward amount storage unit storing attribute information of a viewer who is registered in advance as a viewer of said apparatus and storing a backward amount, if reproduction of contents is stopped halfway for said viewer and the reproduction is to be performed again from a position where the reproduction is stopped, for performing reproduction from a position preceding with respect to the position where the reproduction is stopped,
wherein said calculation unit calculates, as said start position, a position preceding the end position by said backward amount, according to said attribute information.

9. The apparatus according to claim 1, wherein said contents includes video data complying with MPEG (Moving Picture Experts Group) standards, said apparatus comprising:
a detection unit detecting a change in scene of said contents based on said video data, and
said calculation unit calculates said backward amount based on a result of the detection by said detection unit.

10. The apparatus according to claim 1, wherein said generation unit generates said reproduction history information based on a feature amount of a subject who inputs said first instruction, contents identification information for identifying the contents for which said instruction to reproduce is input, and information for specifying an end position where reproduction of said contents is ended,
wherein the calculation unit calculates the backward amount with respect to said end position based on a history of viewing by said subject who inputs said second instruction, and
said apparatus further comprising a confirmation unit confirming, based on a feature amount of said subject whose image is picked up in response to the input of said second instruction, whether said reproduction history information is present in said history storage unit, and if said reproduction history information is present in said history storage unit, said calculation unit calculates said backward amount based on the history of viewing by said subject who inputs said second instruction.

11. The apparatus according to claim 10, wherein said processor further executes an instruction to confirm, based on a feature amount of said subject whose image is pick up in response to the input of said second instruction, whether said reproduction history information is present, and said processor executes, as the instruction to calculate, if said reproduction history information is present, the instruction to calculate said backward amount based on the history of viewing by said subject who inputs said second instruction.

12. The apparatus according to claim 10, wherein
said reproduction history information includes the number of times the reproduction of said contents is performed N,
said processor executes, as the instruction to calculate, the instruction to calculate said backward amount, and
the backward amount equals the fixed backward amount divided by N.

13. The apparatus according to claim 10, wherein
said reproduction history information includes a time elapsed from the last reproduction of the contents,
said processor executes, as the instruction to calculate, the instruction to calculate said backward amount based on the elapsed time, and
the backward amount equals the elapsed time multiplied by the fixed backward amount.

14. The apparatus according to claim 10, wherein
said reproduction history information includes a time period T for which reproduction of said contents is performed,
said processor executes, as the instruction to calculate, the instruction to calculate said backward amount based on the time period T, and
the backward amount equals the fixed backward amount divided by the time period T.

15. The apparatus according to claim 14, wherein
said contents memory further stores a total time period required for reproduction of said contents, and
said processor executes, as the instruction to calculate, the instruction to calculate said backward amount according to a ratio between said time period T for which reproduction of said contents is performed and said total time period.

16. The apparatus in accordance with claim 10, wherein the fixed backward amount is an amount set by the subject.

17. The apparatus in accordance with claim 1, wherein the fixed backward amount is an amount set by the subject.

18. An apparatus for reproducing contents, comprising:
a contents memory storing contents;
a memory driver reading data of contents stored in said contents memory;
an input interface accepting input of an instruction;

a camera picking up an image of a subject to output an image signal;
a program memory storing a command sequence; and
a processor configured to:
    perform a predetermined analysis process based on said image signal to calculate a feature amount of said subject;
    store identification information of said subject and said feature amount associated with said identification information;
    generate, based on input of a first instruction to reproduce contents, reproduction history information representing a history of reproduction of said contents;
    store said reproduction history information;
    based on input of a second instruction to reproduce said contents, cause said camera to pick up an image of a subject who inputs said second instruction;
    based on input of said second instruction and said reproduction history information, determine a start position where reproduction of said contents is started according to said subject; and
    reproduce said contents from said start position,
    wherein the start position is determined from a backward amount with respect to an end position where reproduction of the contents is ended, based on a history of viewing by the subject who inputs the second instruction and a fixed backward amount.

19. The apparatus according to claim 18, wherein said processor executes, as the instruction to generate, the instruction to generate said reproduction history information based on a feature amount of a subject who inputs said first instruction, contents identification information for identifying the contents for which said instruction to reproduce is input, and information for specifying an end position where reproduction of said contents is ended.

20. A method of reproducing contents by contents-storing apparatus based on a command sequence, said apparatus including a contents memory storing said contents, a memory driver reading data of contents stored in said contents memory, a user interface accepting input of an instruction, a camera picking up an image of a subject to output an image signal, a program memory storing a command sequence, and a processor executing said command sequence, said method comprising the steps of:
    performing a predetermined analysis process based on said image signal to calculate a feature amount of said subject;
    storing identification information of said subject and said feature amount associated with said identification information;
    generating, based on input of a first instruction to reproduce contents, reproduction history information representing a history of reproduction of said contents;
    storing said reproduction history information;
    based on input of a second instruction to reproduce said contents, allowing said camera to pick up an image of a subject who inputs said second instruction;
    based on input of said second instruction and said reproduction history information, determining a start position where reproduction of said contents is started according to said subject; and
    reproducing said contents from said start position,
    wherein the start position is determined from a backward amount with respect to an end position where reproduction of the contents is ended, based on a history of viewing by the subject who inputs the second instruction and a fixed backward amount.

* * * * *